Dec. 28, 1948. R. F. WILD 2,457,791
SAFE FAILURE MEASURING AND CONTROLLING APPARATUS
Filed June 21, 1946 8 Sheets-Sheet 1

INVENTOR.
RUDOLF F. WILD
BY Arthur H. Swanson
ATTORNEY.

Dec. 28, 1948.    R. F. WILD    2,457,791
SAFE FAILURE MEASURING AND CONTROLLING APPARATUS
Filed June 21, 1946    8 Sheets-Sheet 2

INVENTOR.
RUDOLF F. WILD
BY Arthur H. Swanson
ATTORNEY.

INVENTOR.
RUDOLF F. WILD

Dec. 28, 1948.　　　　　R. F. WILD　　　　　2,457,791
SAFE FAILURE MEASURING AND CONTROLLING APPARATUS
Filed June 21, 1946　　　　　　　　　　　　　　8 Sheets-Sheet 4

INVENTOR.
RUDOLF F. WILD
BY
Arthur H. Swanson
ATTORNEY.

Dec. 28, 1948.  R. F. WILD  2,457,791
SAFE FAILURE MEASURING AND CONTROLLING APPARATUS
Filed June 21, 1946  8 Sheets-Sheet 5

INVENTOR.
RUDOLF F. WILD
BY
Arthur H. Swanson
ATTORNEY.

Dec. 28, 1948.  R. F. WILD  2,457,791
SAFE FAILURE MEASURING AND CONTROLLING APPARATUS
Filed June 21, 1946  8 Sheets-Sheet 8
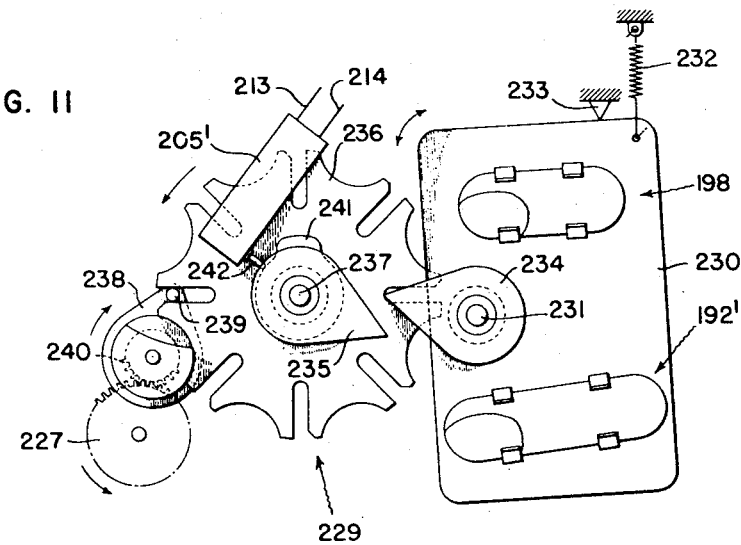
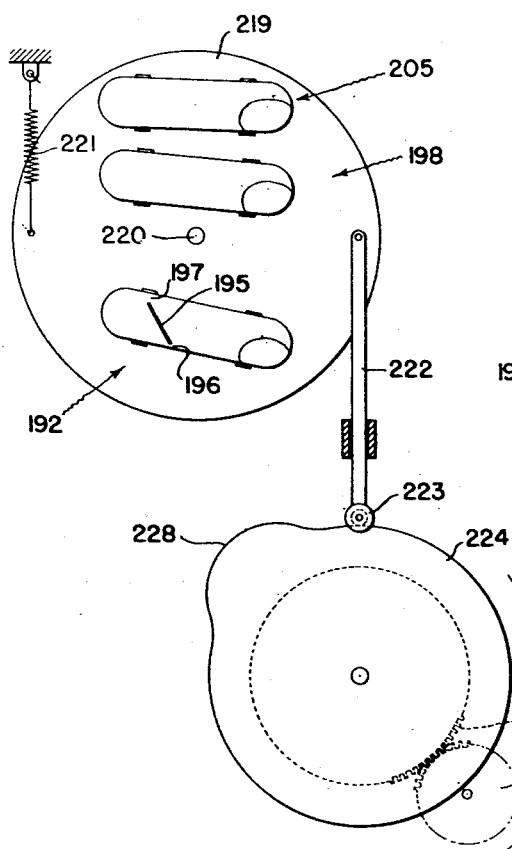
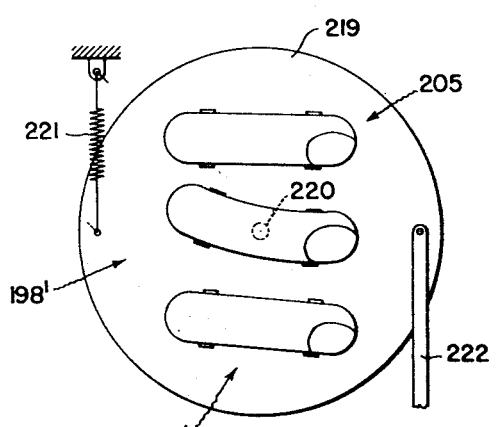
INVENTOR.
RUDOLF F. WILD
BY Arthur H. Swanson
ATTORNEY.

Patented Dec. 28, 1948

2,457,791

UNITED STATES PATENT OFFICE 2,457,791

SAFE FAILURE MEASURING AND CONTROLLING APPARATUS

Rudolf F. Wild, Philadelphia, Pa., assignor to The Brown Instrument Company, Philadelphia, Pa., a corporation of Pennsylvania Application June 21, 1946, Serial No. 678,255

13 Claims. (Cl. 318—20)

The present invention relates to measuring and control apparatus of the type comprising electronic amplifying means through which variations in a minute voltage being measured control the operation of mechanism employed to effect operations on and in accordance with variations in said voltage. Such apparatus may be of widely divergent forms. For example, it may comprise an integrator actuated through an electronic amplifier by a millivoltmeter, or it may be a self-balancing potentiometer including an electronically controlled rebalancing motor.

The general object of the invention is to provide improved means for detecting the inability of the apparatus of the above-mentioned type to function properly as a result of any one of a variety of apparatus defects. In a desirable form of embodiment in self-balancing potentiometric measuring and control apparatus, the invention is used to detect the operative failure of the potentiometric measuring circuit, of the thermocouple connected to said circuit, of any one of the input voltage and power transformers, of the electronic amplifying valves, or of the rebalancing motor itself. In another form of embodiment in such measuring and control apparatus, the present invention is used not only to detect the operative failure of various components of the apparatus, but also to effect replacement of the defective components with suitable stand-by components. This embodiment is of particular utility in connection with controlled processes where it is highly desirable to maintain automatic control of the process at all times, and where it is undesirable to interrupt automatic control upon failure of one or more components of the controlling apparatus. The degree of the importance of maintaining automatic process control upon apparatus failure determines the extent to which stand-by equipment should be provided.

My invention is characterized by the utilization of the amplifying system of the apparatus in creating a high frequency, oscillating current which is used to indicate the occurrence of an apparatus failure, which may be used to control a stand-by system, and which is ordinarily used for the "safe failure" purpose of producing a control effect to minimize the injurious consequences of the apparatus failure. In the embodiment of the invention mentioned above a high frequency current flow is maintained while the potentiometer is in normal operation, and is interrupted when the potentiometer ceases to be normally operative, and the interruption results in actuating a signal and in interrupting the operation of the rebalancing motor. If desirable, the control effect resulting from apparatus failure may be made to cause a shut-down of the controlled process by shutting off the supply of fuel to a furnace, for example. However, in certain processes, particularly those of the oil refining industry, it is not desirable to shut-down the operation of the system upon failure of the control apparatus. Instead, it is desirable to provide either visible or audible indication, or both, upon such control apparatus failure, and to deprive the faulty apparatus of control of the process so that an operator can take over manual control of the process and manually maintain it in operation, thereby avoiding the waste of time and materials which occurs if such a process is shut down before its completion. Also, if desirable and practically necessary, suitable stand-by apparatus may be provided which will automatically be connected to the system to replace components which have failed.

The present invention is further characterized by the relatively few and simple changes and additions required for the use of the present invention in self-balancing potentiometers including electronic amplifying apparatus of a conversion type now in extensive use.

The various features of novelty which characterize my invention are pointed out with particularity in the claims annexed to and forming a part of this specification. For a better understanding of the invention, however, its advantages, and specific objects attained by its use, reference should be had to the accompanying drawings and descriptive matter in which I have illustrated and described preferred embodiments of the invention.

Of the drawings:

Fig. 5A is a diagrammatic representation of a portion of the apparatus of Fig. 5;

Figs. 9, 10, and 11 illustrate in detail portions of the apparatus of Fig. 8.

Figure 1:
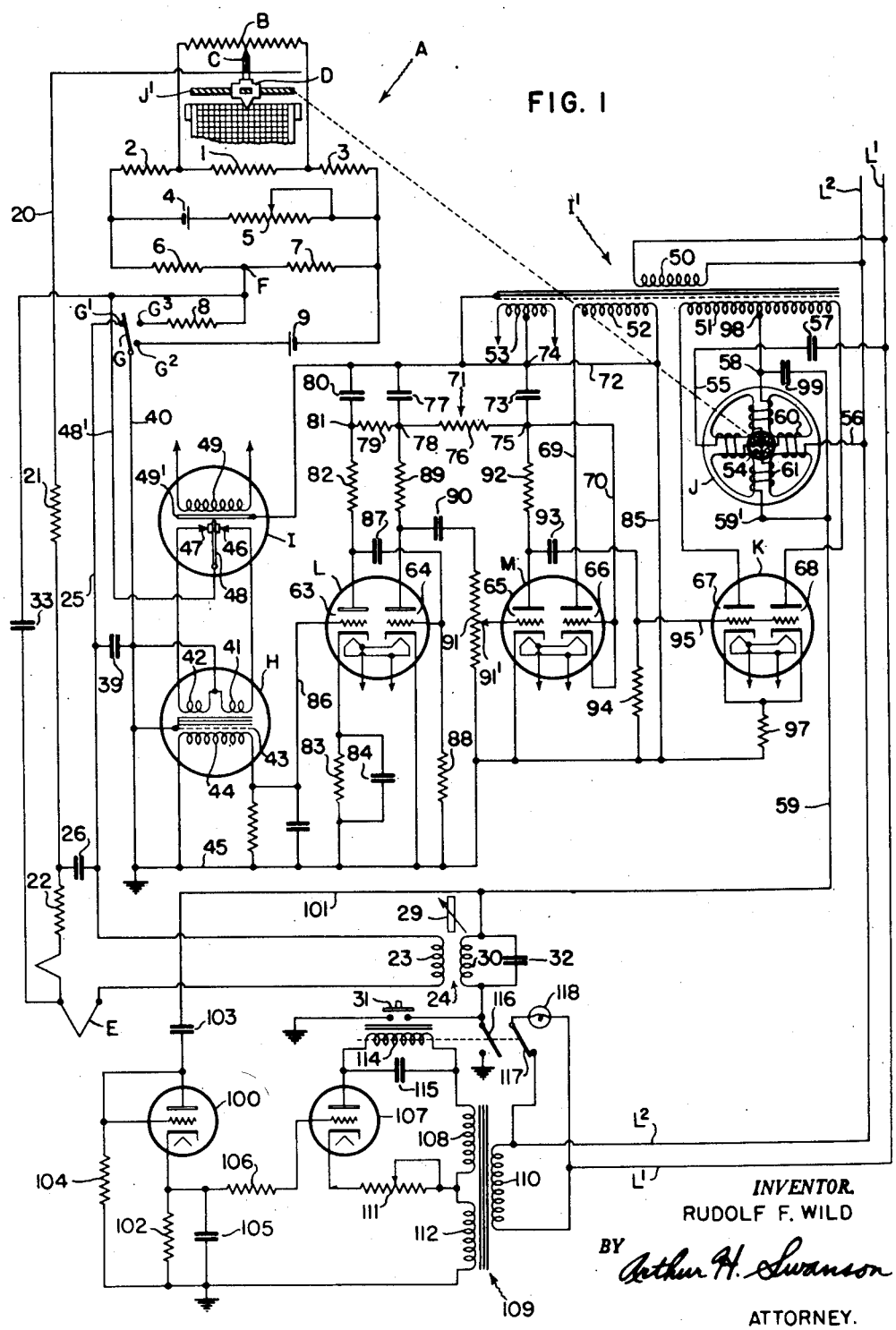
Fig. 1 is a diagrammatic representation of potentiometric apparatus including my improved means for producing a control action on the failure of various apparatus elements.

In Fig. 1, I have diagrammatically illustrated the use of the present invention in potentiometric measuring and control apparatus of the so-called conversion type disclosed in the prior application of Walter P. Wills, Serial No. 421,173, filed December 1, 1941, now matured into Patent No. 2,423,540 issued July 8, 1947. In the apparatus shown, the potentiometric rebalancing operations are effected by a reversible electric motor J, and an automatic control system which controls the operation of the motor J, and includes an electronic amplifier and means comprising a pulsator I, and a transformer H cooperating to impress on the electronic amplifier an alternating control voltage varying in magnitude and phase with the magnitude and direction of potentiometric bridge unbalance, produced by variations in the output of the thermocouple E which is the source of a small D. C. voltage.

The apparatus shown diagrammatically in Fig. 1 comprises a potentiometric bridge circuit A including a slide wire resistance B along which a slider contact C is adjusted through a shaft J' which is rotated by the motor J, and is in threaded engagement with the pen carriage D carrying the contact C. The potentiometric bridge circuit A is shown as of conventional type comprising one branch including series connected resistances 1, 2 and 3, an energizing branch connected in parallel with the first mentioned branch and including a source of current 4 and a regulable resistance 5 connected in series, and a third branch connected in parallel with the energizing branch and with the first mentioned branch and including series connected resistances 6 and 7. The slide wire resistance B is connected in parallel with the resistance 1 between and in series with the resistances 2 and 3.

Associated with the bridge circuit A is a standardizing switch. The latter, as conventionally shown, comprises a movable two-position switch member G and switch contacts G', G² and G³. In the normal operating position of the switch member G, it engages the contact G' and connects the thermocouple E between the slider contact C and the junction point F of the bridge resistances 6 and 7. In its recalibrating position, the switch member G engages and forms a bridge connection between the contacts G² and G³ and thereby connects a resistance 8 and a standard cell 9 in series with the bridge resistance 7. In respect to its features just specifically mentioned, the apparatus shown diagrammatically in Fig. 1 does not differ significantly from the apparatus shown in said prior Wills application.

As shown, the circuit branch connecting slider contact C and bridge point F includes in series between the contact C and switch contact G', the thermocouple E, conductor 20, resistances 21 and 22, the secondary winding 23 of a transformer 24, and a conductor 25. The circuit elements 22, E and 23 are shunted by a condenser 26. The transformer 24 couples the input and output circuits of the electronic amplifying and control system shortly to be described. The transformer 24 has an iron core 29 which may be adjusted to vary the magnitude of the feed-back, or regenerative effect transmitted to said input circuit. The primary winding 30 of transformer 24 has one terminal connected by conductor 59 to one terminal 59' of the control winding 61 of the motor J. The second terminal of the primary winding 30 is connected to ground on the closure of a starting switch 31. When, after the apparatus is thus started into normal operation the starting switch is opened, the ground connection to the winding 30 is maintained by a relay switch 116 associated with the high frequency current detection circuit shown in Fig. 1 and hereinafter described. A condenser 32 is connected in parallel with the primary winding 30. The terminal of the thermocouple E connected to the resistance 22 is directly connected to the bridge point F by a condenser 33.

The circuit connection between the switch contact G' and the bridge point F closed by the movement of the switch member G into engagement with the contact G', includes a conductor 40 connecting the switch member G to the midpoint of the two sections 41 and 42 of the primary winding of the transformer H. A condenser 39 connects the conductors 40 and 25 for a purpose hereinafter explained. The core structure and casing of the transformer H and a shield 43 interposed between the transformer primary windings and its secondary winding 44 are connected to a grounding conductor 45. The latter is also connected to the junction point of the primary winding sections 41 and 42. The remote ends or terminals of the primary winding sections 41 and 42 are connected to the stationary contacts 46 and 47 respectively of the vibrator I. The latter comprises a vibrating reed 48 carrying a contact moved by the vibration of the reed back and forth between the contacts 46 and 47 which it alternately engages.

The vibrating contact 48 is connected by conductor 48' to the bridge point F. The reed 48 is caused to vibrate by a winding 49 having its terminals connected to a source of alternating current. A permanent magnet 49', connected to ground, is associated with the reed 48 for polarizing and synchronizing purposes, and in operation the reed 48 is in continuous vibration with a frequency corresponding to that of the source of energization for the winding 49. In consequence, the currents flowing alternately through the winding sections 41 and 42 create alternating voltages in the secondary winding 44 well adapted for amplification in the electronic relay to the input terminals of which the terminals of the transformer secondary winding 44 are connected.

Said electronic relay comprises a drive section and an amplifying section, both of which receive energizing current from a transformer I' having its primary winding 50 connected to the supply conductors L' and L² and having three secondary winding sections 51, 52, and 53. The drive section of the electronic relay comprises the reversibly rotating motor J and an electronic tube K. The amplifying section comprises amplifying tubes L and M.

The motor J, as diagrammatically shown, comprises a rotor 54 mechanically coupled to the threaded shaft J', the rotation of which, as diagrammatically shown, simultaneously adjusts the contact C and the pen carriage D. The motor J has a pair of terminals 55 and 56 connected through a condenser 57 of suitable value to the alternating supply conductors L' and L², and has a second pair of terminals 58 and 59'. The terminal 58 is connected to the midpoint 98 of the secondary winding 51, and terminal 59' is connected to ground through the conductor 59 and the primary winding 30 of the transformer 24 when either of switches 31 and 116 is closed. For its intended use, the motor J may be of the form schematically shown in the drawings in which one pair of oppositely disposed field poles is surrounded by a winding 60 connected between the motor terminals 55 and 56, and the other pair of poles is surrounded by a winding 61 connected between the motor terminals 58 and 59'.

Since the value of the condenser 57 is so chosen as to produce with the winding 60 a series resonant circuit, the current flowing through the motor winding 60 will be approximately in phase with the voltage of the alternating supply conductors L' and L². The current supply to the winding 61 will either lead or lag the voltage of the alternating current supply conductors L' and L² by approximately 90°. The windings 60 and 61 thus establish fields in the motor J which are displaced from one another approximately 90° in one direction or the other, depending upon whether the winding 61 is energized with current which leads or lags the voltage of the alternating supply conductors L' and L². As will become apparent from the subsequent description, the phase of the current flow through the winding 61 and the rotation of the rotor 54 depends upon, and is controlled by, the direction of unbalance of the potentiometric measuring circuit, and the duration of said rotation depends on the duration of said unbalance so that the rotation of the rotor 54 tends to adjust the contact C to the extent as well as in the direction to rebalance said circuit.

The alternating voltage generated in the secondary winding 44 of the transformer H is amplified through the action of the amplifying tubes L and M and the amplification thus effected is utilized in energizing the phase winding 61 of the motor J to control the selective actuation of the latter for rotation of the rotor 54 in one direction or the other.

As shown, the electronic amplifying tube L includes two heater type triodes within the same envelope and designated by the reference symbols 63 and 64. The triode 63 includes anode, control electrode, cathode, and heater filament elements, and the triode 64 includes like elements. The filaments of the triodes 63 and 64 are connected in parallel and receive energizing current from the low voltage secondary winding 53 of the transformer I'. The conductors through which the secondary 53 supplies current to the heater filaments of the electronic tube L and also to the heater filaments of the tubes M, K, 100, and 107 have not been shown in order not to confuse the drawings.

The electronic amplifying tube M includes two heater type triodes, designated by the reference characters 65 and 66, and within the same envelope. Both of the triodes of tube M include anode, control electrode, cathode and heater filament elements. The electronic tube K also includes two heater type triodes, which have been designated by the reference characters 67 and 68, within the same envelope, and which include anode, control electrode, cathode, and heater filament elements.

The triode 66 of the electronic valve M is utilized as a half-wave rectifier to provide a source of direct current voltage for energizing the anode or output circuits of the triodes 63, 64 and 65. As shown, the control electrode and cathode of the triode 66 are directly connected to each other, and the output circuit thereof is energized by the transformer secondary winding 52 through a circuit which may be traced from the left end terminal of the winding 52, as seen in the drawings, through the conductor 69 to the anode of the triode 66, the cathode thereof, and through a conductor 70 to the positive input terminal 75 of a filter generally designated by the reference numeral 71. The negative terminal 74 of filter 71 is connected by a conductor 72 to the right end terminal of the transformer secondary winding 52, which in turn is connected through the conductor 85 to the grounded conductor 45.

The filter 71 includes a condenser 73 which operates to smooth out the ripple in the output voltage of the filter between the points 74 and 75. The filter 71 also includes a resistance 76 and a condenser 77 which operate to smooth out the output voltage of the filter between the points 74 and 78. The filter 71 includes a further resistance 79 and a condenser 80 for smoothing out the output voltage between the filter points 74 and 81. The filter, therefore, comprises three stages. Such a three-stage filter is provided because for satisfactory and efficient operation it is desirable that the anode voltage supplied to the triode 63 be substantially free from ripple whereas it is not necessary to supply anode voltage so completely free from ripple to the output circuit of the triode 64. Likewise it is not necessary to supply anode voltage as free from ripple to the triode 65 as to the triode 64.

The anode circuit of the triode 63 may be traced from the filter point 81, which comprises the positive output terminal of the filter, through a fixed resistance 82 to the anode of the triode 63, to the cathode thereof, and through a cathode biasing resistance 83, which is shunted by a condenser 84, to the negative filter point 74 through the previously mentioned grounded conductor 45, the conductor 85 and the conductor 72. The cathode biasing resistance 83 and the parallel connected condenser 84 are utilized for biasing the control electrode of the triode 63 negatively with respect to its associated cathode.

The input circuit of the triode 63 may be traced from the cathode to the parallel connected resistance 83 and condenser 84, through the transformer secondary winding 44, and through a conductor 86 to the control electrode of the triode 63.

The output circuit of the triode 63 is resistance-capacity coupled to the input circuit of the triode 64 by means of a condenser 87 and a resistance 88. More particularly, the anode of the triode 63 is connected by condenser 87 to the control electrode of the triode 64, and the control electrode of the triode 64 is connected through the resistance 88 to the grounded conductor 45 and thereby to the grounded cathode of the triode 64. The anode circuit of the triode 64 may be traced from the positive terminal 78 of the filter 71 through a fixed resistance 89 to the anode of the triode 64, the cathode thereof, and conductors 45, 85, and 72 to the negative terminal 74 of the filter.

The output circuit of the triode 64 is resistance-capacity coupled to the input circuit of the triode 65 by means of a condenser 90 which is connected between the anode of the triode 64 and the control electrode of the triode 65, and by means of a resistance 91 which is connected between the control electrode of the triode 65 and the grounded cathode thereof. It is noted that the resistances 88 and 91 which are connected to the input circuits of the triodes 64 and 65, respectively, operate to maintain the control electrodes of the triodes 64 and 65 at the same potentials as their associated cathodes when no voltage is induced in the transformer secondary winding 44, but upon the induction of an alternating voltage in the secondary winding 44, resistances 88 and 91 permit the flow of grid current between the control electrodes of the triodes 64 and 65 and their associated cathodes and thereby limit the extent to which the control electrodes of these triodes are permitted to go positive with respect to their associated cathodes. With the control electrode of triode 65 connected to the resistance 91 by an adjustable contactor 91', as shown, said resistance and contactor form a means for varying the amount of signal impressed on the control electrode of the triode 65 from the plate circuit of the triode 64.

The anode circuit of the triode 65 may be traced from the positive terminal 75 of the filter 71 through a fixed resistance 92 to the anode of the triode 65, the cathode thereof, and conductors 85 and 72 to the negative terminal 74 of the filter. The output circuit of the triode 65 is resistance-capacity coupled to the input circuits of the triodes 67 and 68 by means including a condenser 93 and a resistance 94.

As illustrated the condenser 93 is connected between the anode of the triode 65 and a conductor 95, which in turn is connected to the control electrodes of the triodes 67 and 68, and the conductor 95 is also connected to the cathodes of those triodes through the resistances 94 and 97. Specifically, the resistance 94 is connected between the conductor 95 and ground, the resistance 97 is connected between the cathodes of the triodes 67 and 68 and ground. The resistance 94 limits the extent to which the control electrodes of the triodes 67 and 68 may be driven positive with respect to their associated cathodes.

A voltage is supplied the output circuit of the triodes 67 and 68 from the high voltage secondary winding 51 of the transformer I'. The anode of the triode 67 is connected to the left end terminal of the transformer secondary winding 51 and the anode of the triode 68 is connected to the right end terminal of the transformer secondary winding 51. The cathodes of the triodes 67 and 68 are connected together and through the fixed resistance 97 to ground, and the terminal 59' of the motor J is also connected to the ground through the transformer winding 30 and the switches 31 and 116 as previously explained. The terminal 58 of the motor J is connected to the center tap 98 on the transformer secondary winding 51. Thus, the triodes 67 and 68 are utilized for supplying energizing current from the transformer secondary winding 51 to the phase winding 61 of motor J.

The motor J is preferably so constructed that the impedance of the winding 61 is of the proper value to match the impedance of the anode circuits of the triodes 67 and 68 when the motor is operating in order to obtain the most efficient operation. Preferably, the motor is so constructed that it has a high ratio of inductance to resistance, for example, of the order of 6–1 or 8–1 at the frequency of the energizing current supplied to it. This provides for maximum power during the running condition of the motor with the least amount of heating, and also provides a low impedance path for braking purposes.

As noted hereinbefore, energizing current is supplied to the motor winding 60 from the alternating current supply conductors $L^1$ and $L^2$ through the condenser 57. As previously explained, the condenser 57 is so selected with respect to the inductance of the motor winding 60 as to provide a series resonant circuit having a unity power factor. By virtue of the series resonant circuit, the total impedance of the motor winding 60 is substantially equal to the resistance of the winding, and since this resistance is relatively low, a large current flow through the winding 60 is made possible. This permits the attainment of maximum power and torque from the motor J. In addition, the current flow through the motor winding 60 is in phase with the voltage of the alternating current supply conductors $L^1$ and $L^2$ because of the series resonant circuit. The voltage across the motor winding 60, however, leads the current by substantially 90° because of the inductance of the winding 60.

Energizing current is supplied the motor winding 61 from the transformer secondary winding 51 through the anode circuits of the triodes 67 and 68 through the circuits previously traced. A condenser 99 is connected in parallel with the motor winding 61 and is so chosen as to provide a parallel resonant circuit having a unity power factor. This parallel resonant circuit presents a relatively high external impedance and a relatively low local circuit impedance. The relatively high external impedance is approximately the same as the impedance of the anode circuits of the triodes 67 and 68, and accordingly, provides efficient operation. The relatively low internal circuit impedance approximates the actual resistance of the winding 61, and since this resistance is relatively low, the impedance of the local circuit is also relatively low.

For the first half cycle of the alternating voltage produced across the terminals of the transformer secondary winding 51, the anode of the triode 67 is rendered positive with respect to the center tap 98, and during the following half cycle the anode of the triode 68 is rendered positive with respect to the center tap. Accordingly, the triodes 67 and 68 are arranged to conduct on alternate half cycles of the alternating current supplied by the supply conductors $L^1$ and $L^2$.

When no signal is impressed upon the control electrodes of the triodes 67 and 68, pulsating unidirectional current of twice the frequency of the alternating voltage supplied by conductors $L^1$ and $L^2$ is impressed on the motor winding 61. When thus energized the motor J is not urged to rotation in either direction but remains stationary. Due to the relatively high direct current component of the current then flowing through the motor winding 61, the core structure of the motor winding J tends to become saturated whereby the inductive reactance to the motor winding 61 is made relatively small. The value of the condenser 99, in shunt to the motor winding 61, is so chosen that the condenser and motor winding then provide a parallel resonant circuit. This saturation of the core structure of the motor J operates to exert an appreciable damping effect on the rotor 54, or in other words, an effect tending to prevent rotation of the rotor 54. Consequently, if the rotor 54 has been rotating, saturation of the motor core structure operates to quickly stop the rotation.

When an alternating signal voltage is impressed on the control electrodes of triodes 67 and 68, the magnitude of the pulses of current flowing in the anode circuit of one triode 67 or 68 will be increased while the magnitude of the pulses of current flowing in the anode circuit of the other triode 68 or 67 will be decreased. Accordingly, the pulses of unidirectional current supplied to the motor winding 61 during the first half cycle will predominate over those supplied the motor winding during the second half cycle. Which anode current will be increased depends upon whether the bias voltage is in phase or 180° out of phase with the voltage of supply conductors L¹ and L².

Such energization of the motor winding 61 operates to introduce therein an alternating component of current of the same frequency as that supplied by the alternating current supply conductors L¹ and L². This alternating component of current will either lead or lag the alternating current flowing through the motor winding 60 by approximately 90° depending upon which of the triodes 67 and 68 has its anode current increased by the prevailing grid signal voltage, and with either phase relation the two currents produce a magnetic field in the motor core structure which rotates in one direction or the other, depending upon said current phase relation, and effects rotation of the motor rotor 54 in the corresponding direction. Moreover, when the motor winding 61 is so energized, the direct current component of the current flowing therein is decreased, and consequently, the saturation of the motor core structure is decreased with the result that the rotor damping effect is reduced.

When the temperature of the thermocouple E is steady and the positions of the pen carriage D and the contact C are correct for that temperature, no signal potential is transmitted to the controlling electrodes of the triodes 67 and 68 by the anode circuit of the triode 65. Since the grid bias potential is then zero, the rotor 54 of the motor J has no tendency to rotate. Upon an increase in the temperature of the thermocouple E, a signal potential will be applied to the control electrodes of the triodes 67 and 68 by the anode circuit of the triode 65 which will result in rotation of the motor J in a direction to move the pen carriage D up-scale. Conversely, upon a decrease in the temperature of the thermocouple E, a signal potential will be applied to the control electrodes of the triodes 67 and 68 by the anode circuit of the triode 65 which will result in rotation of the motor J in a direction to give the pen carriage D a down-scale adjustment.

With the control winding 61 of the motor J connected to ground through the transformer winding 30 and condenser 32, as shown, the transformer 24 couples the output and input circuits of the electronic amplifying system. The coupling transformer is then operative to transfer energy from the output circuit to the input circuit of the system as required for the maintenance of an oscillating current flow at a frequency determined by the parameters of the coupled circuits. The electronic amplifying and control system shown in Fig. 1 is of a standard and well known type, which has been in extensive use in this country for several years, and typical values of its resistance, inductance, and capacitance elements, and of its energizing voltages, are well known.

For the purposes of the present invention, the precise frequency of the high frequency oscillation current maintained is not critical. Advantageously, however, it is of the order of 15 to 20 kilocycles, in which frequency range the amplifier gain is considerably lower than it is in its normal operating range of 60 cycles. Consequently the high frequency oscillation does not overload the amplifier, nor significantly interfere with the available amplifier power output. To maintain current oscillations of that frequency in the standard amplifying system shown, the inductance of the primary winding 30 may well be such that the circuit including it and the condenser 32 will be broadly tuned when the capacitance of the condenser 32 is 0.1 microfarad. The mutual inductance of the windings 23 and 30 may be varied by adjustment of the transformer core 29. Appropriate capacitance values for condensers 26, 33, and 39 are 500, 0.1 and 0.5 microfarads, respectively. The resistances 21 and 22 may be 25 and 150 ohms, respectively. The resistance 22 is a damping resistor, and the resistance 21 is employed to minimize the effect of changes in resistance of the potentiometer circuit between the point F and the contact C as the latter is moved along the range of the slide wire resistance B.

Figure 2:
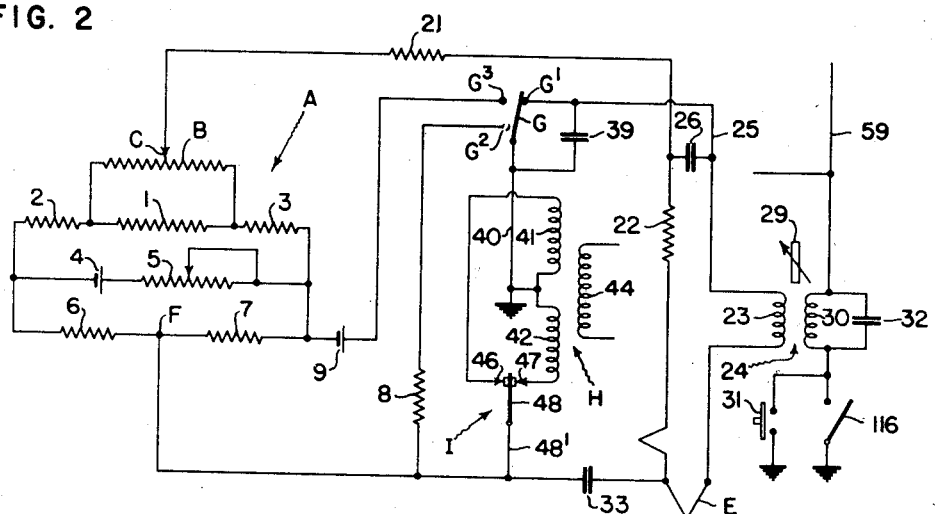
Fig. 2 is a simplified diagram illustrating characteristic features of the arrangement shown in Fig. 1.

Fig. 2 is a simplified showing of the feed back and amplifier inputs from which it is readily apparent that there are three circuit branches for high frequency current flow connected in parallel to the secondary winding 23 of the coupling transformer 24, namely: the branch including the damping resistor 22, thermocouple E, and condenser 26; the branch including the condenser 26, slider contact C, bridge point F, condenser 33, thermocouple E, and the measuring bridge circuit connecting said contact and point; and the circuit including thermocouple E, condenser 33, conductor 48', vibrator switch 48, transformer primary windings 41 and 42, and switch contact member G and G'.

As Fig. 2 makes clearly apparent, the condenser 39 maintains a high frequency current path of flow through the last mentioned circuit branch during the standardizing operation in which the switch member G is disconnected from the contact member G'. The circuit branch including the damping resistor 22 is of relatively high impedance which does not vary in operation, and proper operation could be maintained even if the value of resistance 22 were materially lower than 150 ohms. The resistance 21 is needed because the resistance of the measuring circuit between the contact C and point F varies quite widely as the contact C is adusted, and can be quite low when that contact is at one end of its range of movement.

With the standard amplifying and control system shown, the high frequency oscillating current will ordinarily be maintained during alternate half-cycles only of the 60 cycle alternating supply voltage used in energizing the power stage of the system. This is due to the fact that the phasing of the input transformer H changes during each half cycle and one phase only is suitable for generation of high frequency signals. However, if an excessive amount of feed back signal is supplied to the thermocouple input circuit, high frequency oscillations are produced during each half cycle, probably as a result of the capacitance coupling of the windings of the input transformer H.

The amplifying and control apparatus shown in Fig. 1, including the coupling connection between the amplifier input and output circuits hereinafter described, is so proportioned and arranged that in regular use the high frequency signal may be detected in the amplifier output circuit at all times at which the 60 cycle signal impressed on the amplifier input circuit does not exceed its maximum normal operation value, and will disappear when the 60 cycle signal increases above said value.

Any interruption of the high frequency current flow operates through the detector circuit, shortly to be described, to open the switch 116 and thereby prevent further operation of the motor J until the ground connection to the motor winding 61 is re-established.

With the apparatus shown in Fig. 1 in its normal operating condition, the high frequency signal is maintanied as well when the potentiometer system is balanced and the motor J is stationary, as when the system is unbalanced and the motor J is revolving in one direction or the other at maximum speed. Moreover the high frequency oscillating current will not be interrupted by the adjustment of the switch member G, or as a result of changes in the thermocouple electromotive force and the resultant rebalancing adjustments of the slider contact C. The high frequency current will be interrupted, however, by the development of any one of numerous defects or failures in the amplifying and control system which will prevent the apparatus from functioning properly.

Thus the high frequency current flow will be interrupted not only on a breakage in the thermocouple, but also when an incipient thermocouple failure results in a substantial increase in the thermocouple resistance. Normally the resistance of the thermocouple is so small as to be negligible in this connection, but in an incipient stage of its failure the thermocouple resistance may increase to one or two hundred ohms before the actual thermocouple breakage occurs. As Fig. 2 makes apparent, such an increase in thermocouple resistance would interrupt the high frequency current flow through all of its paths of flow in the input circuit portion of the amplifying and control system. The high frequency current will also be interrupted on the failure of any of the voltage amplifier tubes, and on the development of any defect in the control system causing any one of the amplifier tubes to be over-driven. Furthermore, any mechanical failure of the motor preventing the latter from rotating will soon interrupt the high frequency current as the resultant measuring circuit unbalance increases so that a 60 cycle voltage signal will be impressed on the amplifier, which is large enough to over-drive any one of the amplifier tubes.

The appearance and disappearance of the high frequency signal under different conditions as above described may be explained as follows. In the contemplated use of the apparatus shown in Fig. 1, the high frequency signal rides on top of the normal 60 cycle signal impressed on the amplifying and control system through the transformer H, and is continuously apparent in the amplifier output circuit so long as the amplitude of the 60 cycle signal is within its normal predetermined range. The high frequency signal is clipped or interrupted as a result of cut-off and/or saturation of the plate current in the third stage amplifying triode 65 on an abnormal increase in the 60 cycle signal produced by the development of any of the above mentioned operation defects. The conditions of operation under which the high frequency signal will and will not ride through the amplifier on the 60 cycle signal, may be varied by changing the amplitude of either or both of said signals. In ordinary practice, however, the apparatus must be so proportioned and arranged that the maximum normal amplitude of the 60 cycle signal is that required to insure the desired operation characteristics of the rebalancing motor J. It is readily possible, however, t make the amplitude of the high frequency signal such that that signal will be readily detectable in the amplifier output circuit at all times in which the 60 cycle signal is not abnormally high.

In this connection, assume that the apparatus is so proportioned and arranged that with intermediate values of the two signal currents, the high freqency signal will appear in the amplifier output circuit superimposed upon the peak portions of the low frequency signal current.

With apparatus so proportioned and arranged, the extent of increase in the low frequency signal current required to prevent the appearance of the high frequency signal in the output circuit may be increased and decreased by respectively increasing and decreasing the high frequency signal current.

A detector circuit operative to open the switch 116 and if desired, to actuate a signal on the interruption of the high frequency current, may take various forms. In Fig. 1 I have illustrated the detector circuit which I now consider preferable for use in an arrangement of the type shown in Fig. 1. This detector circuit comprises electronic amplifying and control means for amplifying the high frequency potential difference between the conductor 59 and ground. It also comprises an electromagnetic relay mechanism controlled by said means and operating the previously mentioned switch 116, and, as shown, also operating a signal controlling switch 117.

The detector system of Fig. 1 comprises an electronic valve 100 having its anode and its control electrode connected to the conductor 59 through a branch conductor 101 and a condenser 103, and having its cathode connected to ground through a resistance 102 which may be of two megohms. To suitably minimize the amount of amplification of 60 cycle signal reaching the valve 100, I provide a filter comprising a condenser 103 through which the conductor 101 is connected to the anode of valve 100, and a resistance 104 through which said anode is connected to ground. The condenser 103 may have a capacitance of 2500 micro-microfarads, and the resistance 104 may be 10,000 ohms. As shown, a condenser 105 of 0.05 microfarad is connected in parallel with the resistance 102. The cathode of valve 100 is also connected through a resistance 106, which may well be 0.25 megohm, to the control grid of a second electronic valve 107. The latter is a triode and may be the second of the two valves of a 7N7 tube, the valve 100 being the first valve.

The plate circuit of the valve 107 includes the secondary winding 108 of a transformer 109 which has its primary winding 110 connected to the 60 cycle supply conductors $L^1$ and $L^2$. One terminal of the secondary winding 108 is connected to the cathode of the valve 107 by a variable resistance 111 having a maximum resistance value which may well be 500 ohms. By varying the amount of the resistance 111 in circuit, the sharpness of the response to the decrease in the high frequency signal may be regulated. A secondary winding 112 of the transformer 109 is employed to raise the potential of the cathode of the valve 107 relative to the ground potential and to the potential of the control grid of the valve 107. The transformer secondaries 108 and 112 may well develop voltages of 225 and 12 volts, respectively.

The plate circuit of the valve 107 includes in series with the transformer secondary 108, the winding 114 of an electro-magnetic relay switch mechanism which when energized closes the previously mentioned switch 116 and opens the signal switch 117. As shown, a condenser 115 of 8 microfarads capacity is connected in shunt to the winding 114. The switch 117, when closed, connects the terminals of an alarm, which may be an electric lamp 118 or an electric bell, to the supply conductors $L^1$ and $L^2$. The switch 116 is biased to open its contacts when the winding 114 is deenergized, and the switch 117 is biased to close its contacts when the winding 114 is deenergized.

Figure 3:
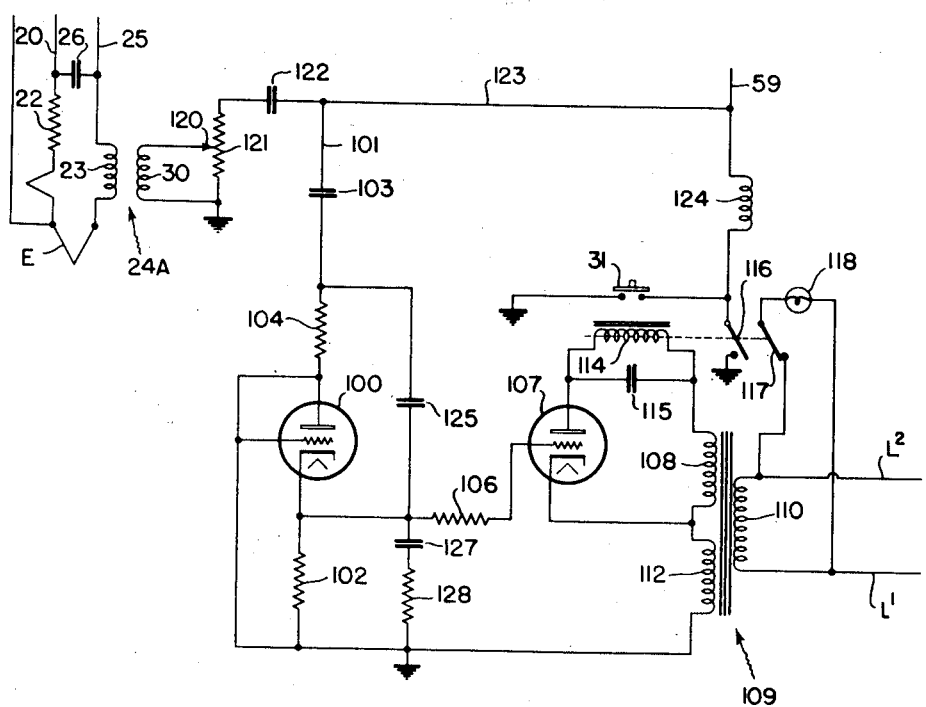
Fig. 3 is a diagram illustrating a modification of the oscillation detecting circuit portion of the apparatus shown in Fig. 1.

As those skilled in the art will recognize, the apparatus by which the high frequency feed back signal is introduced into the amplifying and control system may take various forms. In Fig. 3, I have illustrated an input and output coupling arrangement quite different from that shown in Fig. 1. Fig. 3 also shows a modification of the detector system shown in Fig. 1. The apparatus shown in Fig. 3 may be included in apparatus exactly like that shown in Fig. 1, except for differences which are shown in Fig. 3.

In Fig. 3, I make use of a coupling transformer 24A having secondary and primary windings 23 and 30, respectively, and which may be like the transformer 24 of Fig. 1 in all other respects, except that it does not require or include the adjustable core 29 of the transformer 24. The secondary winding 23 of the transformer 24A of Fig. 3 is connected in series with the thermocouple E as in Fig. 1. The connections to the primary winding 30 of Fig. 3 are quite different, however, from those shown in Fig. 1. In Fig. 3, one terminal of the winding 30 is connected to a contact 120 adjustable along a potentiometer resistance 121. The latter may be of 500 ohms, and has one terminal connected to the second terminal of the winding 30 and to ground. The second terminal of resistance 121 is connected through a condenser 122 and a conductor 123 to the amplifying and control system output conductor 59 which in the Fig. 3 arrangement connects the motor winding 61, not shown, to one terminal of a choke coil 124. As shown, the choke coil 124 has its second terminal connected to the starting switch 31 and to the relay switch 116 just as does the corresponding terminal of the winding 30 in the arrangement shown in Fig. 1. In a practically operative embodiment of the form of the invention illustrated in Fig. 3, the values of the condenser 122 and the choke coil 124 are 1000 micro-microfarads and 30 millihenries respectively.

The detector circuit shown in Fig. 3 is in many respects like that shown in Fig. 1, and corresponding detector circuit parts are designated by the same reference symbols in both figures. In Fig. 3, the filter employed to avoid 60 cycle voltage action on the detector includes a second filter condenser 125 interposed between the resistance 106 and the junction between the condenser 103 and the ungrounded end of the resistance 104. The condenser 125 may be of 2500 micro-microfarads capacity. In Fig. 3, the anode of the valve 100 is connected to the control electrode of that valve, and to ground. The cathode of the valve 100 is connected to the junction between the condenser 125 and the resistance 106 and to the control grid of the valve 107 through the resistance 106, as in Fig. 1. The condenser 105 of Fig. 1 is replaced in Fig. 3 by a condenser 127 and a resistance 128 connected in series. The condenser 127 may have a capacity of .05 microfarad and the resistance 128 may be a half megohm. Except as above noted, the detector circuit and associated signal circuit of Fig. 3 are exactly like those of Fig. 1, except that the variable resistance or rheostat 111 in the cathode circuit of the valve 107 of Fig. 1 is omitted in Fig. 3.

There is no essential difference between the general operation of the apparatus shown in Fig. 1 and the same apparatus when modified, as shown in Fig. 3, only by the substitution of the input and output circuit coupling connections and detector circuit of the latter figure. The coupling of the detector circuit of Fig. 1 is simpler, however, than that shown in Fig. 3, and some of the impedance elements shown in Fig. 3 are appreciably more costly to produce than the elements used in lieu of them in Fig. 1.

It is to be noted that the precise impedance and voltage values hereinbefore stated, are not critical and all of them are subject to modification as conditions make desirable. The values stated, however, are values which have been tested and found suitable for the purposes hereinbefore stated.

Heretofore potentiometric measuring and control apparatus of the general type illustrated herein has included safety provisions, different from those disclosed herein, for preventing improper operation of the apparatus as a result of some apparatus failure or failures. I believe, however, that I am the first to use the amplifier of such apparatus in creating a high frequency oscillation current used in providing protection against injurious operation resulting from apparatus failure. I also believe that no prior embodiment of potentiometric measuring and control apparatus of the type illustrated has included means providing protection against the injurious results of as many different forms of apparatus failure as does the embodiment of my invention disclosed herein. I know of no prior arrangement including a measuring circuit network and a rebalancing motor in which a motor defect preventing normal motor operation will actuate an alarm signal device. I believe I am the first, also, to provide measuring and control apparatus of the general type disclosed, with protective means automatically actuated by an incipient thermocouple failure, when that failure is one which has not made the thermocouple circuit non-conductive, but has materially increased the thermocouple resistance.

The means which I have devised for utilizing the amplifier of measuring and control apparatus of the general type disclosed herein, in creating a high frequency oscillating current may be employed in arrangements serving purposes other than the safety purposes described herein, and in my copending application—Serial No. 678,256, filed concurrently with the instant application, I have illustrated arrangements in which such a high frequency oscillation current is utilized to produce a control effect when balance is attained, or closely approached, at the end of a rebalancing operation. The control effect thus produced may subject the rebalancing motor to a damping action or it may actuate a recording mechanism. In said copending application, I generically claim certain inventive features disclosed in common in that application and in the instant application.

Figure 5:
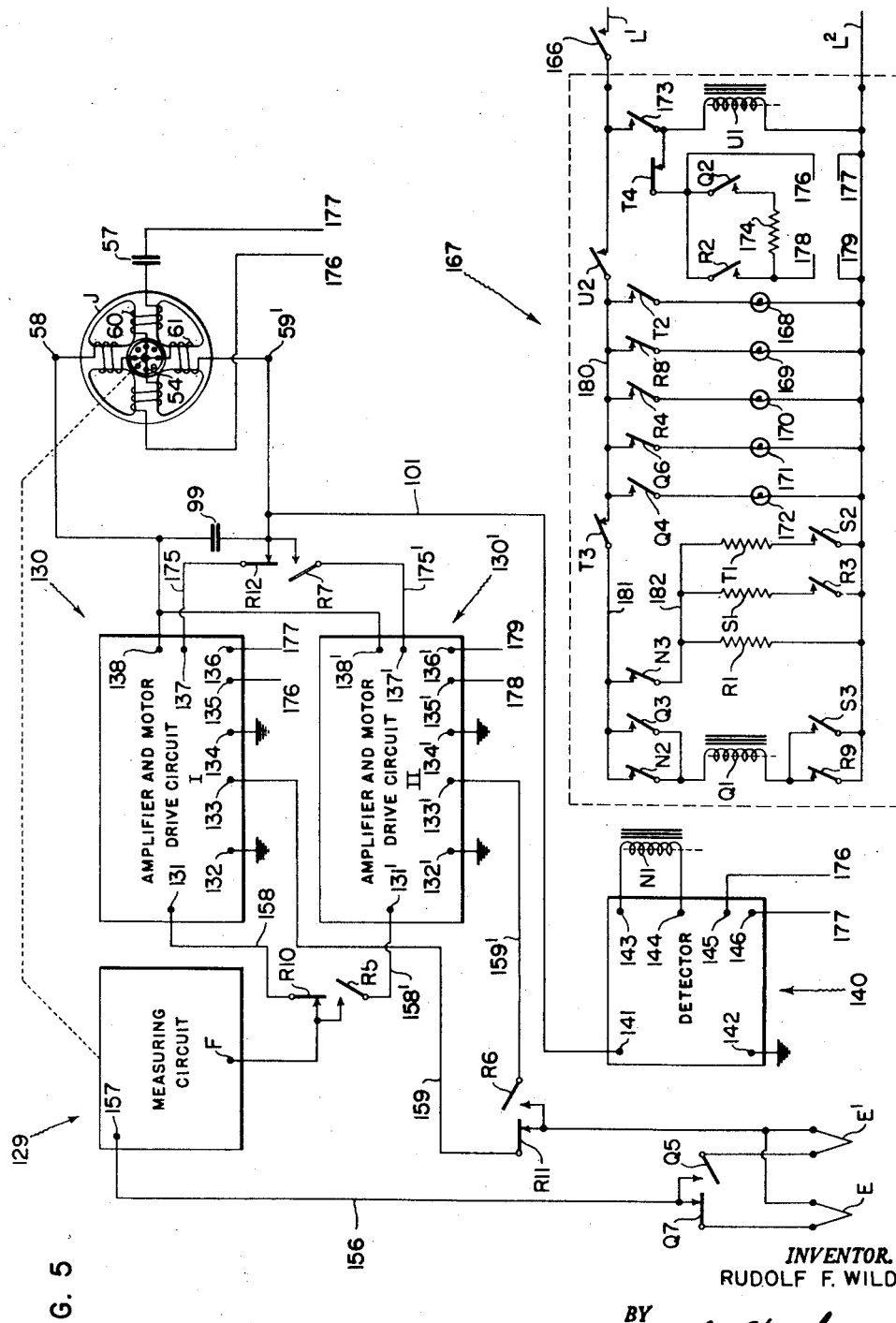
Fig. 5 is a diagram of a modification of the apparatus of Fig. 4 wherein additional stand-by apparatus is provided.
Figure 6:
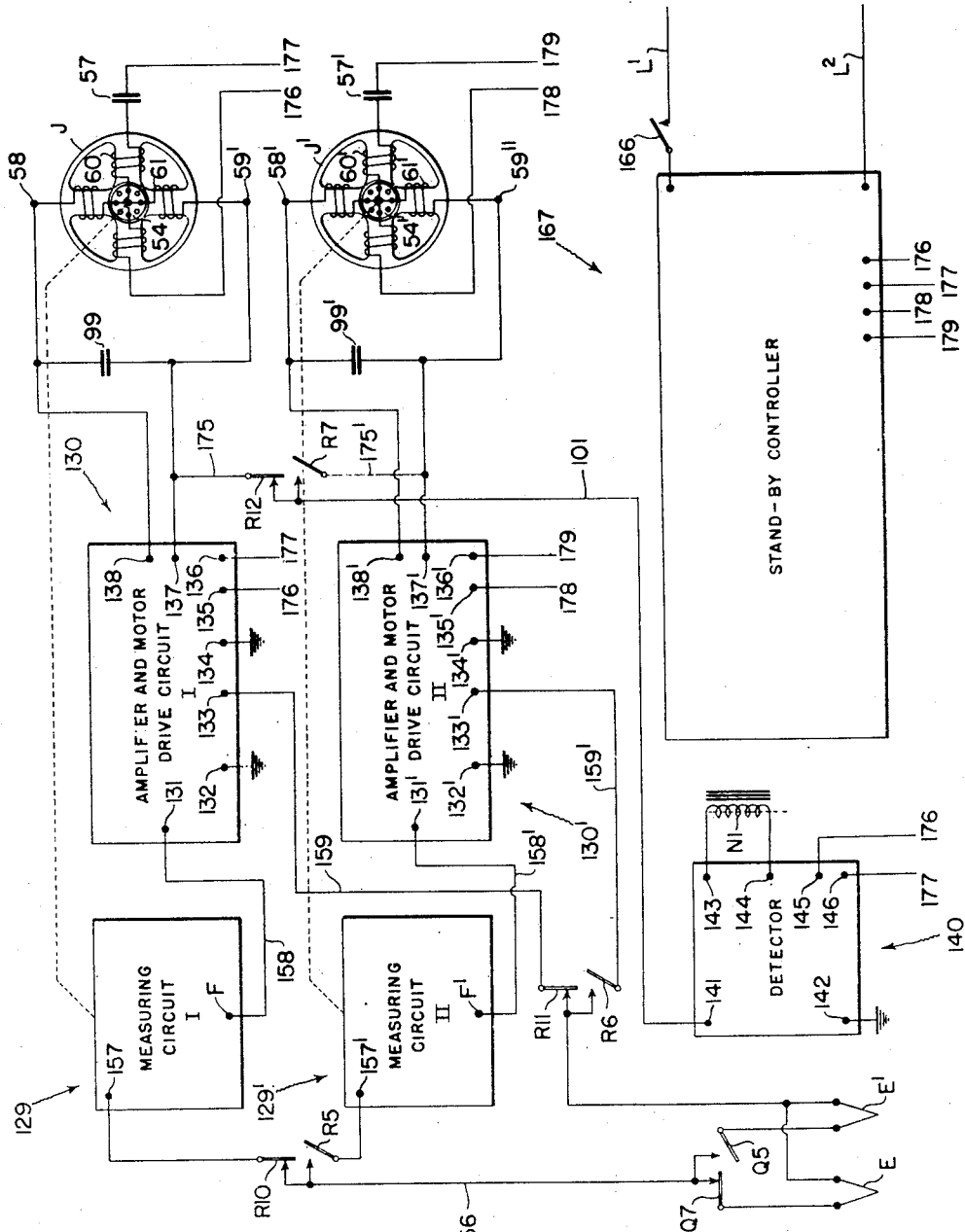
Fig. 6 is a diagram of another modification of the apparatus of Fig. 4 wherein additional standby apparatus is provided.
Figure 7:
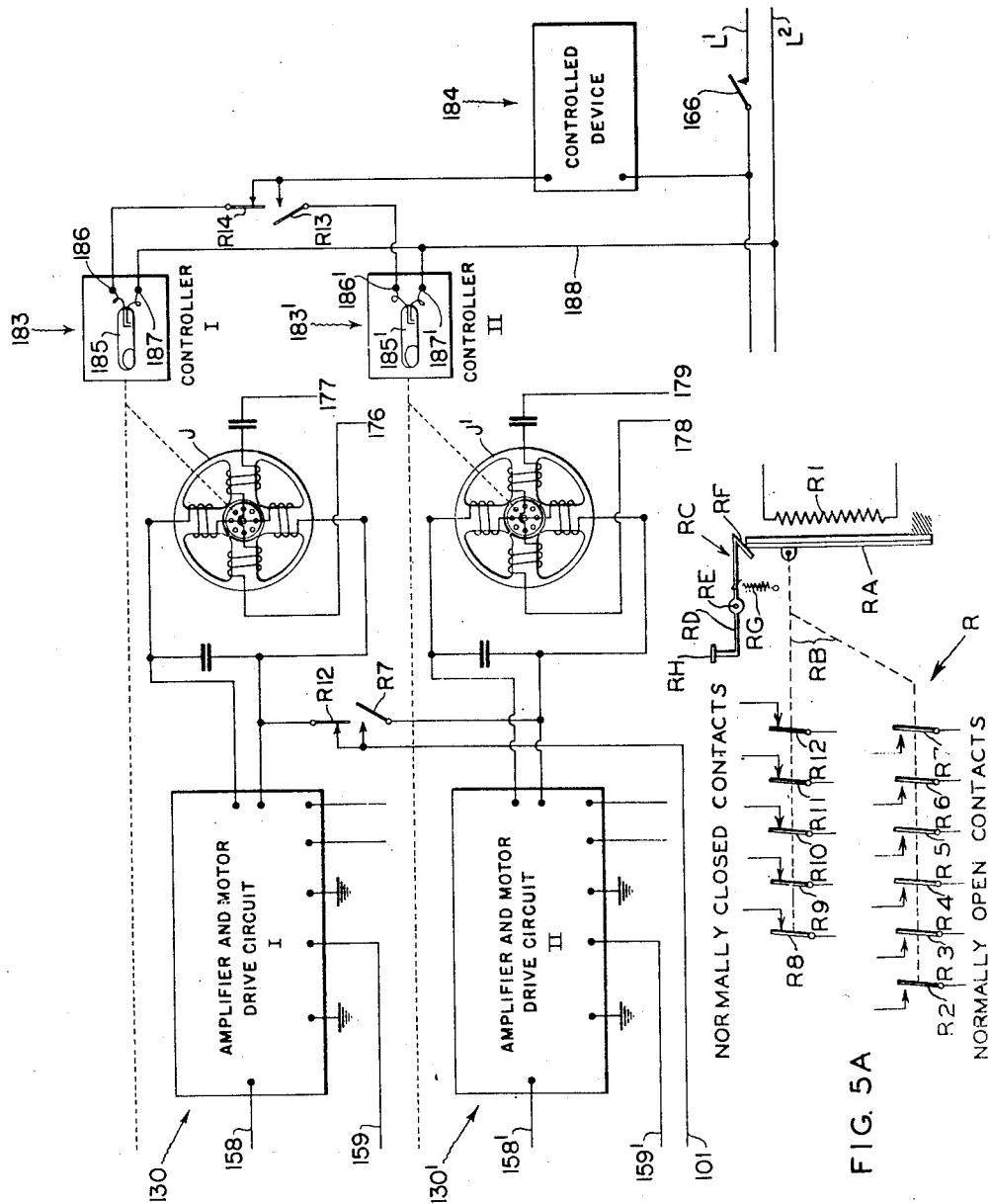
Fig. 7 is the diagram of a modification of the apparatus of Fig. 6 adapted for control purposes.

There are illustrated in Figs. 4 to 7, inclusive, further embodiments of the present invention wherein are provided means for automatically replacing various of the system components with equivalent stand-by components, should the original components become defective and inoperative. As was previously mentioned herein, in the automatic control of numerous processes it is essential that the process be kept in operation continuously over a desired period, any interruption of the process during this period generally being costly and wasteful, and hence, highly undesirable. Therefore, upon failure of the automatic control system controlling such a process, it is not desirable to have the process halted by such failure, but it is desirable and practical in such cases to provide automatic means for replacing with stand-by components the particular component or components whose failure has produced the control system failure. Such means are provided in the systems about to be described, the system of Fig. 4 being provided with a stand-by thermocouple, the system of Fig. 5 being provided with a stand-by amplifier and motor drive circuit as well as a stand-by thermocouple, and the system of Fig. 6 being provided with a stand-by measuring circuit and a stand-by rebalancing motor in addition to the stand-by equipment of the system of Fig. 5. In Fig. 7 are illustrated means for shifting process control from the main portion of the system of Fig. 6 to the stand-by portion when the latter is substituted for the former upon failure of the main portion.

Figure 4:
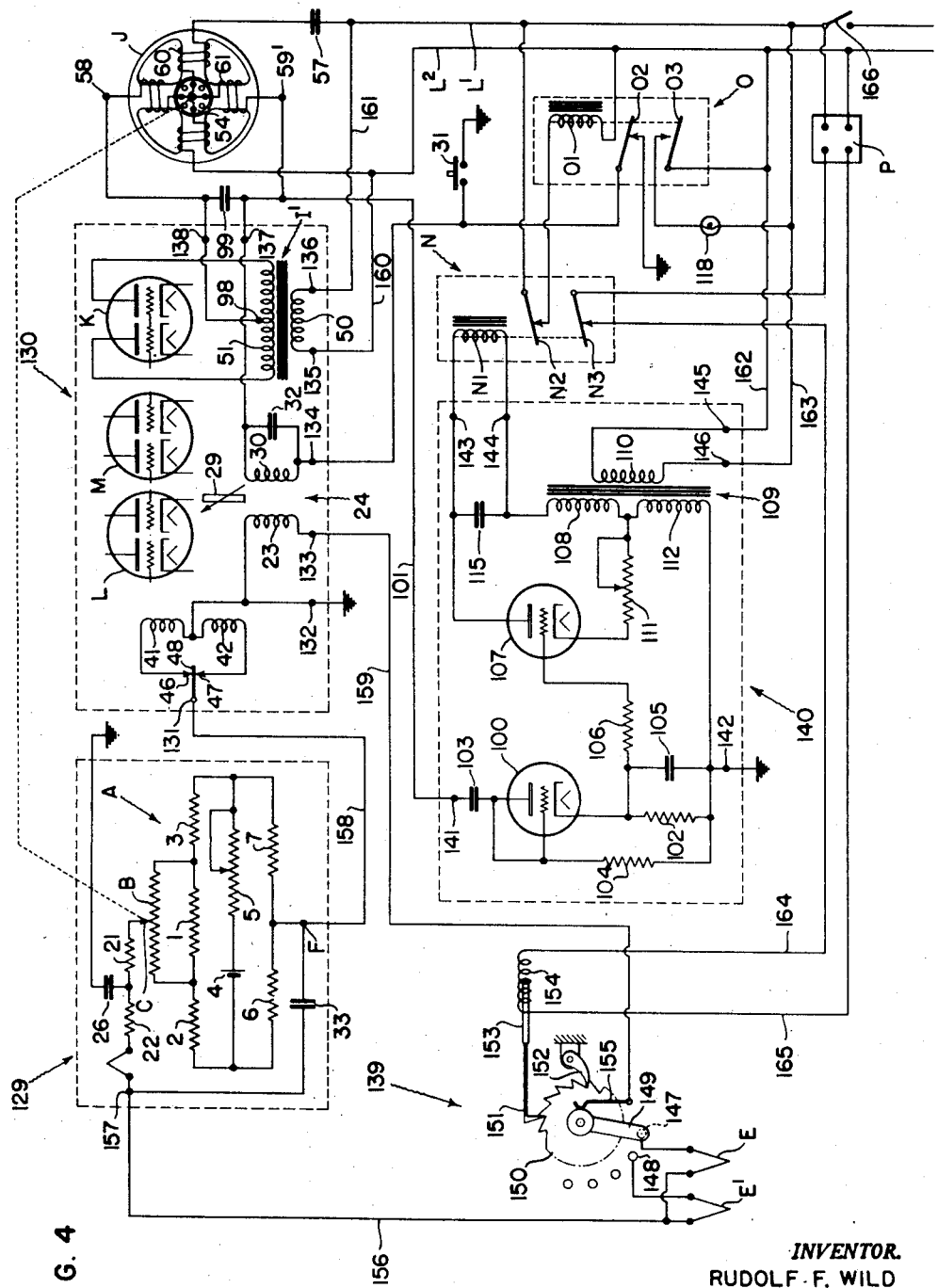
Fig. 4 is a diagram illustrating the use of the present invention in providing automatic stand-by protection.

Specifically, there is illustrated in Fig. 4 an embodiment of the present invention wherein the high frequency oscillation signal derived as previously described is utilized in a measuring system, similar to that illustrated in Fig. 1, to effect replacement of the thermocouple E should the latter fail and become open-circuited while the system is in operation. As shown, the system of Fig. 4 comprises a measuring circuit 129 which consists of the potentiometric bridge circuit A, the thermocouple cold junction, the condensers 33 and 26, and the resistances 21 and 22 all as shown in Fig. 1. The system of Fig. 4 also includes an amplifier and motor drive circuit 130 which comprises the following components of Fig. 1: the converter I, the input transformer H, the feed-back transformer 24, the power transformer I', the amplifier circuit including the amplifying tubes M and L and associated components, and the motor drive circuit including the tube K and associated components. The circuit 130 also includes a terminal 131 which is connected to the reed 48 of the vibrator I, a terminal 132 which is connected to the junction between the primary winding sections 41 and 42 of the input transformer H, terminals 133 and 134 which are connected to the lower ends of the secondary and primary windings 23 and 30, respectively, of the feed-back transformer 24, terminals 135 and 136 which are connected to the respective ends of the primary winding 50 of the power transformer I', and terminals 137 and 138 connected, respectively, to the upper end of the primary winding 30 of the transformer 24 and to the center tap 98 on the secondary winding 51 of the transformer I'. In Fig. 4, only certain components of the amplifier and motor drive circuit 130 just described are shown, in order not to unduly complicate the drawing. All components of the circuit 130, not shown in Fig. 4, are identical with, and are connected in the same manner as the corresponding components of Fig. 1.

The circuit of Fig. 4 also includes the following: a stepping switch generally designated at 139, a thermocouple E', electromagnetic relays N and O, a time delay relay P, and a detector circuit 140, as well as the following components as shown in the circuit of Fig. 1: the motor J, the motor condensers 57 and 99, the supply conductors L' and L², the push-button starting switch 31, the thermocouple E, and the warning lamp 118. The apparatus of Fig. 4 may comprise standardizing provisions as shown in Fig. 1, but no such provisions are shown in Fig. 4 in order to avoid unnecessary complication of the drawing.

The detector circuit 140 of Fig. 4 comprises the following components as shown in Fig. 1: the condensers 103, 105, and 115, the tubes 100 and 107, the resistances 102, 104, 106, and 111, and the power transformer 109. These components are connected as shown in Fig. 1 to form a detector for the high frequency oscillation signal substantially as described hereinbefore. The circuit 140 also includes a terminal 141 which is connected to the anode of the tube 100 through the condenser 103, a terminal 142 which is connected to the anode of the tube 100 through the resistance 104, terminals 143 and 144 connected, respectively, to the anode of the tube 107 and to the upper end of the secondary winding 108 of the transformer 109, and terminals 145 and 146 connected, respectively, to the opposite ends of the primary winding 110 of the transformer 109.

The stepping switch 139 comprises a plurality of relatively stationary contacts of which the contacts 147 and 148 are examples, and a movable contact member 149 adapted to successively engage said stationary contacts and actuated through a ratchet wheel 150 and associated pawl members 151 and 152 from a plunger 153 operating in a coil 154. The switch 139 is so arranged that upon each energization of the coil 154, the plunger 153 and pawl member 151 will advance the movable contact arm 149 from one stationary contact to the next, for example from the contact 147 to the contact 148. The pawl 152 prevents motion of the contact arm 149 in a reverse direction during the return motion of the plunger 153 which occurs when the coil 154 is de-energized. A brush member 155 is in contact with the contact arm 149 to connect the latter to the external circuit.

The relay N comprises an operating coil N1, a pair of normally closed contacts N2, and a second pair of normally closed contacts N3. Normally closed contacts are closed when their associated operating coil is de-energized. The relay O comprises an operating coil O1, a pair of normally closed contacts O2, and a pair of normally open contacts O3. Normally open contacts are open when their associated operating coil is de-energized.

One terminal of each of the thermocouples E and E' is connected by a conductor 156 to a terminal 157 of the measuring circuit 129, which in turn is connected to the slider contact C of the bridge circuit A through the thermocouple cold junction and the resistances 21 and 22. The bridge terminal F is connected by a conductor 158 to the input terminal 131 of the amplifier and motor drive circuit 130. The terminal 133 of the latter circuit is connected by a conductor 159 to the movable contact member 149 of the switch 139 through the brush 155. From the contact arm 149, the conductor 159 is connected to whichever of the contacts 147 and 148 and the associated thermocouples E and E' that is in contact with the arm 149. It can thus be seen that either of the thermocouples E or E' or any other thermocouples, not shown, which may be connected to the other stationary contacts, will be connected into the measuring and amplifying circuit in the same manner as shown in Fig. 1, with the difference, as hereinbefore mentioned, that no standardizing provisions are shown in connection with the apparatus of Fig. 4.

The power winding 60 of the motor J is connected in series with condenser 57 across the supply conductors L' and L². The terminal 58 of the control winding 61 of the motor J is connected to the terminal 138 of the circuit 130 and thence to the center tap 98 on the transformer secondary winding 51. The other terminal 59' of the motor winding 61 is connected to the terminal 137 of the circuit 130 and thence to the upper end of the primary winding 30 of the transformer 24. The condenser 99 is connected in parallel with the motor control winding 61. The terminal 59' is also connected by the conductor 101 to the input terminal 141 of the detector circuit 140. The energizing terminals 135 and 136 of the circuit 130 are respectively connected by branch conductors 160 and 161 to the supply conductors L² and L'. The connections to the motor J of Fig. 4 are seen, therefore, to be the same as those of Fig. 1.

The terminal 132 of the circuit 130 is connected to ground, as is the terminal 142 of the circuit 140. The coil N1 of the relay N is connected between the terminals 143 and 144 of the detector circuit 140, as is the coil 114 of Fig. 1. The energizing terminals 145 and 146 of the circuit 140 are respectively connected by branch conductors 162 and 163 to the supply conductors L² and L'.

The coil O1 of the relay O is connected in series with the contacts N2 between the conductors L' and L². One terminal of the coil 154 of the switch 139 is connected by a conductor 164 and through the contacts N3 to one output terminal of the time delay relay P. The other terminal of the coil 154 is connected by a conductor 165 to the other output terminal of the relay P, and the input terminals of the latter are respectively connected to the conductors L' and L². The time delay relay P connects the coil 154 and contacts N3 in series between the conductors L' and L² at a predetermined time after the line switch 166 located in the conductor L' is closed, for a reason to be explained hereinafter.

The terminal 134 of the circuit 130 is connected to ground through the relay contacts O2 of the relay O and through the push-button switch 31. Thus the terminal 59' of the motor control winding 61 is grounded through the transformer primary winding 30 in a manner similar to that accomplished by the switch 116 of Fig. 1. The warning lamp 118 is connected in series with the contacts O3 of the relay O between the conductors L' and L². The relay O is of the time delay pick-up, instantaneous drop out type, but the time delay period of the relay O is quite shorter than that of the relay P, as will be explained hereinafter.

In the operation of the apparatus of Fig. 4, on the assumption that the switch 166 is open and that the apparatus is consequently de-energized, and also that the switch 139 is in the position shown, with contact members 147 and 149 in contact and thermocouple E connected in the measuring circuit, the relays N and O will be de-energized, and the signal lamp 118 will be extinguished. When switch 166 is closed, the tubes in the circuits 130 and 140 will start to heat up, and at first, no high frequency signal will be set up. Relay N will therefore remain de-energized, energizing relay O which will pick up at the end of its time delay period. Switch 139 will not as yet have its coil 154 energized due to the time delay of the relay P. When relay O picks up, the warning lamp 118 will light, indicating that no high frequency signal is present as yet. After the warm-up period has elapsed, during which time the push-buttom switch 31 should be manually held in the closed position, the high frequency signal will appear in the system, assuming that all is in order. At this point, the relay N will be energized, which will de-energize the relay O. This causes the warning lamp 118 to be extinguished, and causes the motor J to be permanently connected in circuit, allowing the push-botton switch 31 to be released. By this time, the relay P will have pick-up, but since the relay N is now energized, the coil 154 of the switch 139 will remain de-energized. The apparatus will now operate normally, in the usual manner.

Upon a failure of some component or components which causes the high frequency signal to disappear from the system, the relay N will be de-energized and the coil 154 will thereby be energized. The switch 139 will operate, therefore, to disconnect the thermocouple E from the measuring circuit and to connect in its place the second thermocouple E'. In the meantime, the relay O will be energized, but will not pick-up due to its time delay action. If failure or incipient failure of the thermocouple E was the cause of the disappearance of the high frequency signal, the replacement of the thermocouple E by the thermocouple E' will cause the high frequency signal to reappear and the relay N to be re-energized before the relay O has had sufficient time to pick-up. Operation of the system will then continue as before the failure occurred.

If failure of the thermocouple E was not the cause of the high frequency signal's disappearance, replacement of the thermocouple E by the thermocouple E' will not produce a reappearance of the high frequency signal. Consequently, the relay N will remain de-energized, and the relay O will remain energized, and at the end of the time delay period of the latter, the relay O will pick-up, de-energizing the motor J and causing the warning lamp 118 to be lighted. The same operation as just described will occur upon a second failure following a failure of the thermocouple E. If desired, additional thermocouples can be connected between the conductor 156 and the stationary contact members of the switch 139, providing further thermocouple failure stand-by protection. Upon the failure of the second thermocouple, therefore the third will be tried, and upon failure of the third, the fourth will be connected to the measuring circuit, and so on until all of the thermocouples have failed, at which time the motor J will be de-energized and the warning lamp lighted. No matter how many thermocouples are provided, a failure other than that of a thermocouple will cause the warning lamp to be lighted in the same time after the failure as described above, since this time is the time delay period of the relay O. This time delay is made just long enough to permit switching from one thermocouple to the next. The time delay of the relay P is made sufficiently long so that the switch 139 cannot operate until the circuits 130 and 140 have had sufficient time to bring their tubes up to normal operating temperature.

In Fig. 5 is illustrated a modification of the apparatus of Fig. 4 which provides amplifier and motor drive circuit stand-by protection in addition to thermocouple stand-by protection. The apparatus of Fig. 5 comprises the thermocouples E and E', the measuring circuit 129, the amplifier and motor drive circuit 130, the motor J and associated condensers 57 and 99, the relay N, and the detector circuit 140, all as shown and described hereinbefore. In addition, the system of Fig. 5 comprises a second amplifier and motor drive circuit 130' and a stand-by controller 167, the latter replacing the switch 139, the relays O and P, and the warning lamp 118. The circuit 130' may well be, and is shown as being identical with the previously described circuit 130, having terminals 131', 132', 133', 134', 135', 136', 137', and 138', corresponding to the similarly-numbered terminals of the circuit 130. The internal connections of the circuits 129, 130, 130', and 140 are identical in Fig. 5 with the corresponding circuits of Figs. 1 and 4, hence these circuits are shown in simplified form in Fig. 5 in order not to cause unnecessary complication of the drawing.

The stand-by controller 167 of Fig. 5 comprises a plurality of electromagnetic and electrothermal relays Q, R, S, T, and U, the respective component parts of which are not shown in their usual physical relation in order to avoid unnecessary complication of the drawing. The representation of the controller 167 is thereby made in Fig. 5 by a so-called "across the line" drawing, wherein the various contacts forming the different relays are not necessarily shown in their actual physical relationship. Also, various of the relay contacts are shown physically external to the controller circuit, but actually all of these relay contacts are physically located within the controller proper.

The controller 167 also includes a plurality of indicating lamps 168, 169, 170, 171, and 172, the function of which will be described hereinafter. The relay N is also preferably located within the controller proper.

The relay N comprises an operating coil N1, and 2 pairs of normally closed contacts N2 and N3, respectively. Relay N is of the instantaneous electromagnetic type as in the circuit of Fig. 4. The relay Q is also of the instantaneous electromagnetic type comprising an operating coil Q1, four pairs of normally open contacts Q2, Q3, Q4, and Q5, respectively, and two pairs of normally closed contacts Q6 and Q7, respectively. The relay R, which is shown in detail in Fig. 5A, is of the electrothermal time delay pick-up, lock-in type, comprising a heating coil R1, six pairs of normally open contacts R2, R3, R4, R5, R6, and R7, respectively, and five pairs of normally closed contacts R8, R9, R10, R11, and R12, respectively. The relay R also comprises a bimetallic actuating member RA which is in thermal contact with the heating coil R1. When the coil R1 is energized, it produces heat, which causes bending movement of the actuating member RA to the left as viewed in Fig. 5A. This movement is operative through a linkage RB to close the normally open contacts R2, R3, R4, R5, R6, and R7 and to open the normally closed contacts R8, R9, R10, R11, and R12. This action is termed pick-up, and occurs after the time delay period has elapsed from the time the heating coil was first energized. Once the contacts are in the positions just described, a relay latching mechanism RC locks the actuating member RA in the picked-up position, so that upon subsequent de-energization of the heating coil R1, the normally open relay contacts remain closed and the normally closed contacts remain open, until the relay is manually unlatched or reset by an operator.

The latching mechanism RC includes an arm member RD which is pivotally secured to the body of the relay at RE. The arm RD carries a bent latch portion RF which is held in engagement with the end of the actuating member RA by a spring RG, as shown in Fig. 5A. When the heating coil R1 is energized and consequently heats up, causing the upper end of the member RA to bend to the left in Fig. 5A, the latch portion RF rides up on the end of member RA, allowing the latter to pass beneath the arm RD. Further bending of the member RA, at the expiration of the time delay period, causes the latch portion RF to drop into holding engagement with the right-hand side of the member RA, whereby the latter is held in the picked-up position, the normally open contacts are held closed, and the normally closed contacts are held open. When the heating coil R1 and the member RA have subsequently cooled, the member RA can be returned to the deenergized position by depressing a reset button RH. This button is mounted on the arm RD and is operative when depressed to raise the latch portion RF out of engagement with the member RA to allow the latter to return to its normal position under the action of its own resiliency, thereby opening the normally open contacts and closing the normally closed contacts.

The relays S and T, about to be described, are also of this same electrothermal, time delay pick-up, lock-in type. These relays have not been shown in detail since they are identical to the relay R, just described, except as to the number of contacts operated thereby.

The relay S comprises a heating coil S1 and two pairs of normally open contacts S2 and S3, respectively. The relay T comprises a heating coil T1, a pair of normally open contacts T2, and two pairs of normally closed contacts T3 and T4, respectively. The relay U is of the time delay pick-up, electromagnetic type, comprising an operating coil U1 and a pair of normally open contacts U2. The relay U has instantaneous drop out, and may well be like the relay P of Fig. 4.

Also included in the controller 167 are an on-off switch 173 and a resistance 174, the function of which will be described hereinafter. It is to be noted in connection with the description of the relays just given that the phrases "normally open contacts" and "normally closed contacts" refer to the condition in which the particular relay is not picked-up, or in the case of an instantaneous relay, is not energized. This applies even though in operation, the particular relay may normally be picked-up or energized.

In Fig. 5, one terminal of the thermocouple E is connected through the contacts Q7 and by the conductor 156 to the input terminal 157 of the measuring circuit 129. One terminal of the thermocouple E' is also connected to the conductor 156 through the contacts Q5. The remaining terminals of the thermocouples E and E' are connected together and to the terminal 138 of the amplifier and motor drive circuit 130 through the contacts R11 and by the conductor 159. These last mentioned thermocouple terminals are also connected through the contacts R6 and by a conductor 159' to the terminal 138' of the circuit 130'. The terminal F of the circuit 129 is connected through the contacts R10 and by the conductor 158 to the terminal 131 of the circuit 130, and the terminal F is also connected through the contacts R5 and by a conductor 158' to the terminal 131' of the circuit 130'. The terminals 132, 134, 132', and 134' of the circuits 130 and 130' are all connected to ground.

The terminal 58 of the control winding 61 of the motor J is connected to the terminals 138 and 138' of the circuits 130 and 130' respectively. The motor terminal 59' is connected through the contacts R12 and, by a conductor 175 to the terminal 137 of the circuit 130, and the terminal 59' is also connected through the contacts R7 and by a conductor 175' to the terminal 137' of the circuit 130'. The condenser 99 is connected between the motor terminals 58 and 59' as before.

The motor terminal 59' is also connected by the conductor 101 to the input terminal 141 of the detector circuit 140. The terminal 142 of the latter circuit is connected to ground. The relay coil N1 is connected across the output terminals 143 and 144 of the circuit 140 as before.

In the controller 167, the relay coil U1 is connected in series with the switch 173 across the conductors L' and L². The junction between the switch 173 and the coil U1 is connected through the contacts T4 and by a conductor 176, partially shown, to the energizing terminal 135 of the circuit 130. The other energizing terminal 136 is connected by a conductor 177, partially shown, to the conductor L². The motor power winding 60, in series with the condenser 57, is also connected across the conductors 176 and 177, and the energizing terminals 145 and 146 of the circuit 140 are respectively connected to the conductors 176 and 177.

The conductor 176 is connected through the contacts R2 to a conductor 178, partially shown, which in turn is connected to the energizing terminal 135' of the circuit 130'. The conductor 178 is also connected to the conductor 176 through the resistance 174 and the contacts Q2, connected in series. The other energizing terminal 136' of the circuit 130' is connected by a conductor 179, partially shown, to the supply conductor L².

A conductor 180 is connected to the conductor L' through the contacts U2. Between the conductor 180 and the conductor L² are connected the following: the contacts Q4 in series with the indicating lamp 172, the contacts Q6 in series with the lamp 171, the contacts R4 in series with the lamp 170, the contacts R8 in series with the lamp 169, and the contacts T2 in series with the warning lamp 168.

A conductor 181 is connected to the conductor 180 through the contacts T3, and a conductor 182 is connected to the conductor 181 through the contacts N3. Between the conductor 182 and the conductor L² are connected the following: the relay coil R1, the relay coil S1 in series with the contacts R3, and the relay coil T1 in series with the contacts S2.

One terminal of the relay coil Q1 is connected to the conductor 181 through the contacts N2. The other terminal of the coil Q1 is connected to the conductor L² through the contacts R9. The contacts Q3 are connected in parallel with the contacts N2, and the contacts S3 are connected in parallel with the contacts R9.

In the operation of the system of Fig. 5, on the assumption that the line switch 166 is closed and that all is in order, but that the on-off switch 173 is open and the system is therefore inoperative, all relay contacts are in their normal positions as shown in Fig. 5, since all of the relay coils are de-energized and all relays are dropped-out. When the switch 173 is closed, the relay coil U1 and the amplifier and motor drive circuit 130 will be energized, as will be the detector circuit 140 and the power winding 60 of the motor J. As soon as the tubes of the circuits 130 and 140 have come up to their operating temperatures, the high frequency signal will appear in the system, and the relay coil N1 will be energized, opening the contacts N2 and N3. By this time, the relay U will pick-up, closing the contacts U2, since its time delay period is adjusted to allow time for the various tubes to come to their operating temperatures. When the contacts U2 close, the conductor 180 will be energized, and the lamps 171 and 169 will be lighted through contacts Q6 and R8, respectively. The lamp 171 may well be labeled "Thermocouple I" and the lamp 169 may be labeled "Amplifier I." Thus the lighting of the lamps 171 and 169 will indicate that the system is employing a certain thermocouple and a certain amplifier, these being the thermocouple E and the circuit 130 of Fig. 5. In this operating condition, which for convenience will be called condition 1, the thermocouple circuit can be traced from one terminal of the thermocouple E and through the contacts Q7, the conductor 156, the circuit 129, the contacts R10, and the conductor 158 to the input terminal 131 of the circuit 130, through the circuit 130, not shown in Fig. 5, to the terminal 133, and through the conductor 159 and the contacts R11 to the other terminal of the thermocouple E. The output circuit can be traced from the output terminal 137 of the circuit 130, through the conductor 175 and the contacts R12 to the motor terminal 59', through the motor control winding 61 to the terminal 58, and from there to the other output terminal 138 of the circuit 130. The input to the detector circuit 140 is permanently connected between the motor terminal 59' and ground by the conductor 101 and the grounded conductor as shown. Since the relay N is energized, the relays Q, R, S, and T will not be energized.

When a failure occurs in the system of Fig. 5, the controller 167 will immediately switch the system to operating condition 2, and upon a subsequent failure, or if condition 2 does not remedy the first failure, the system will be switched to operating condition 3. If condition 3 does not remedy the failure, or upon a subsequent failure, the system will be switched to operating condition 4. If condition 4 does not remedy the failure, or if a subsequent failure occurs, the system will be switched to alarm condition 5, wherein an alarm will be given and the system will be de-energized. For convenience, the major components which will be operatively connected in the system for the various operating conditions are listed below:

Operating condition 1: thermocouple E and circuit 130.
Operating condition 2: thermocouple E' and circuit 130.
Operating condition 3: thermocouple E and circuit 130'.

Operating condition 4: thermocouple E' and circuit 130'.

When a failure occurs while the system is in condition 1, or if there is a system defect when the system is first put into operation, the relay N will either be de-energized or will not have been energized at the start, since there will be no high frequency signal present in the system. In either case, contacts N2 and N3 will be closed, which will energize and pick-up relay Q, energize relay R, and place the system in condition 2. When relay Q picks up, it will seal itself in through contacts Q3 and will cause the lamp 171 to be extinguished by opening contact Q6, the lamp 172 to be lighted through contacts Q4, the second amplifier and motor drive circuit 130' to be energized with voltage somewhat below line voltage through the resistance 174 and the contacts Q2 to allow the circuit 130' to be brought nearly to its operating temperature, and the thermocouple E' to be substituted for the thermocouple E in the thermocouple circuit by the opening of contacts Q7 and closing of contacts Q5. The lamp 172 may well be labeled "Thermocouple II."

If the failure was due to the thermocouple E, replacement of the latter by the thermocouple E' will cause the reappearance of the high frequency signal and the relay N will be energized and contacts N3 opened before the relay R has sufficient time to pick up. The relay R will then be de-energized, the relay Q will remain energized, the lamps 172 and 169 will remain lighted, and the tubes of the circuit 130' will be maintained at nearly their operating temperatures. The thermocouple circuit for condition 2 can be traced from one terminal of the thermocouple E' and through the contacts Q5, the conductor 156, the circuit 129, the contacts R10 and the conductor 158 to the terminal 131, through the circuit 130 to the terminal 133, and through the conductor 159 and the contacts R11 to the other terminal of the thermocouple E'. The output circuit for condition 2 is identical with that of condition 1.

If the failure was due to something other than failure of the thermocouple E, substitution of the thermocouple E' will not cause the appearance of the high frequency signal, hence the relay N will remain de-energized and the relay R will pick-up at the end of its time delay period and lock in. This places the system in condition 3, with the following results: the second amplifier and motor drive circuit 130' will be energized at full voltage through contacts R2, the relay coil S1 will be energized through contacts R3, the lamp 170 will be lighted through contacts R4, and the circuit 130' will be connected to the measuring circuit 129 through R5, to the thermocouple circuit through R6, and to the motor J through R7. Also, the lamp 169 will be extinguished by the opening of contacts R8, the relay Q will be de-energized by the opening of contacts R9, and the circuit 130 will be disconnected from the circuit 129, from the thermocouple circuit, and from the motor J by the respective opening of the contacts R10, R11, and R12. De-energization of the relay Q will remove the shunted resistance 174 from the circuit by the opening of contacts Q2, will extinguish the lamp 172 by the opening of contacts Q4, will disconnect the thermocouple E' from the circuit 129 by the opening of the contacts Q5, will light the lamp 171 through contacts Q3, and will connect the thermocouple E to the circuit 129 through contacts Q7.

From the foregoing description it can be seen that in condition 3, the thermocouple E is again placed in use, the substitute thermocouple E' is removed from the circuit, and that the first amplifier and motor drive circuit 130 is removed from the system and is replaced by the second amplifier and motor drive circuit 130'.

If the failure was due to the circuit 130, replacement of the latter by the circuit 130' will cause the reappearance of the high frequency signal, and the relay N will be energized and contacts N3 opened before the relay S has had sufficient time to pick up. The relay coils will then be de-energized, and since relay Q is not energized and relay R is locked in the picked-up position, the lamps 171 and 170 will remain lighted. The lamp 170 may well be labeled "Amplifier II."

The thermocouple circuit for condition 3 can be traced from one terminal of the thermocouple E and through the contacts Q7, conductor 156, circuit 129, contacts R5, and conductor 158' to the terminal 131' of the circuit 130', through this circuit to the terminal 133', and through the conductor 159' and contacts R6 to the other terminal of the thermocouple E. The output circuit for condition 3 can be traced from the terminal 137' of the circuit 130', through the conductor 175' and the contacts R7 to the motor terminal 59', through the motor control winding 61 to the terminal 58, and from there to the other output terminal 138' of the circuit 130'.

If the failure was due to something other than the circuit 130, or was due to both the circuit 130 and the thermocouple E, substitution of the circuit 130' will not cause the high frequency signal to appear, hence the relay N will remain de-energized and the relay S will pick up at the end of its time delay period and lock in. This places the system in condition 4, with the following results: the relay coil T1 will be energized through contacts S2, and the relay coil Q1 will be energized through contacts S3. Therefore, the relay Q will pick up and be sealed in by the contacts Q3, the lamp 172 will be lighted through contacts Q4, the thermocouple E' will be connected in the system through contacts Q5, the lamp 171 will be extinguished by the opening of contacts Q6, and the thermocouple E will be removed from the circuit by the opening of contacts Q7.

From the foregoing description it can be seen that in condition 4, the thermocouple E is again replaced in the system by the thermocouple E', and that the latter is connected to the input of the second amplifier and motor drive circuit 130'.

If the last mentioned failure was due to the thermocouple E, replacement of the latter by the thermocouple E' will cause the appearance of the high frequency signal, and the relay N will be energized and contacts N3 opened before the relay T has had sufficient time to pick up. The relay coil T1 will then be de-energized, and since relays R and S are locked in, and relay Q is sealed in, lamps 172 and 170 will remain lighted.

The thermocouple circuit for condition 4 can be traced from one terminal of the thermocouple E' and through the contacts Q5, conductor 156, circuit 129, contacts R5, and conductor 158' to the terminal 131', through the circuit 130' to the terminal 133', and through the conductor 159' and contacts R6 to the other terminal of the thermocouple E'. The output circuit for condition 4 is identical with that for condition 3.

If the last mentioned failure was due to something other than or in addition to the thermocouple E, substitution of the thermocouple E' will not cause the high frequency signal to appear, hence the relay N will remain de-energized and the relay T will pick up and lock in at the end of its time delay period, placing the system in condition 5. This is the warning and shut-down condition, the picking up of relay T causing the warning lamp 168 to be lighted through contacts T2 and causing de-energization of the stand-by control circuit and the entire system by the opening of the respective contacts T3 and T4. Thus the system is prevented from giving false indications subsequent to the last mentioned failure, and any device or devices normally controlled by the system are thereby not subjected to improper control.

The time delay periods of the relays R, S, and T are advantageously adjusted to be as short as possible and still allow time for the switching of the system components. The relays R, S, and T are provided with suitable manually-operated reset means, as previously described in connection with Fig. 5A, which are used to reset the controller 167 when defective components are replaced.

In the system of Fig. 5, provision is made for effecting replacement of only the thermocouple or the amplifier and motor drive circuit, and no provision is made for replacing the measuring circuit or the motor J. Consequently, upon failure of either or both of these components, the system will pass rapidly through conditions 1, 2, 3, and 4 into condition 5. In Fig. 6, however, there is illustrated a modification of the circuit of Fig. 4 wherein there is provided a standby measuring circuit 129' and a standby motor J', in addition to the standby thermocouple E' and standby circuit 130' of Fig. 5. The circuit 129' is identical with the circuit 129 of Figs. 4 and 5, having terminals 157' and F' corresponding to the respective terminals 157 and F of the circuit 129. The motor J' is identical with the motor J, having component and associated parts 57', 58', 59'', 60', 61', and 99' which correspond to the parts 57, 58, 59', 60, 61, and 99 of the motor J. Also in the circuit of Fig. 6 there is included the measuring circuit 129, the thermocouple E, the amplifier and motor drive circuit 130, the motor J, the detector circuit 140, the relay N, and the standby controller 167, all as in the system illustrated in Fig. 5.

As shown in Fig. 6, one terminal of the thermocouple E is connected through the contacts Q7 to the conductor 156, which in turn is connected to the terminal 157 of the circuit 129 and to the terminal 157' of the circuit 129' through contacts R10 and R5, respectively. The terminal F of the circuit 129 is connected by the conductor 158 to the terminal 131 of the circuit 130, and the terminal F' of the circuit 129' is connected by the conductor 158' to the terminal 131' of the circuit 130'. The remainder of the thermocouple circuit of Fig. 6 is identical with that of Fig. 5.

In the output circuit of Fig. 6, the terminals 58 and 59' of the motor J are respectively connected to the output terminals 138 and 137 of the circuit 130, and the terminals 58' and 59'' of the motor J' are respectively connected to the output terminals 138' and 137' of the circuit 130'. The conductor 101 is connected to the terminal 137 through the contacts R12 and the conductor 175, and is also connected to the terminal 137' through the contacts R7 and the conductor 175'. The power winding 60' of the motor J' is connected in series with the condenser 57' between the conductors 178 and 179, and the condenser 99' is connected in parallel with the motor control winding 61'. All other connections for the circuit of Fig. 6 are identical with the corresponding connections of Fig. 5.

The operation of the system of Fig. 6 is identical with that of Fig. 5, except that in the system of Fig. 6. the substitution of a second amplifier and motor drive circuit in conditions 3 and 4 is accompanied by the simultaneous substitution of a second measuring circuit and motor.

It may be noted here that the standby systems disclosed herein are applicable for use with condition-measuring elements other than thermocouples, and that the number and type of units included for standby purpose may be varied to suit the particular application in which the system is to function.

If the apparatus of Fig. 6 is to be used for control purposes, means must be provided for shifting the control from the main unit to the standby unit when the latter is substituted in the system for the former in conditions 3 and 4. Such means are illustrated in Fig. 7, wherein is shown a portion of the system of Fig. 6 in which are provided control means 183 and 183', respectively actuated by the motors J and J' of the main and standby system portions. The control means 183 and 183' may be of any type, but are conveniently shown in Fig. 7 as being of the mercury switch type actuated by the motors J and J' respectively, and controlling a device 184, which may be any suitable device capable of being controlled by such control means. The mechanism by which the motors J and J' actuate the respective controllers 183 and 183' may be of any of the many suitable types known to those skilled in the art, and no such mechanism is illustrated herein in order to avoid unnecessary complication of the drawing.

The circuit of Fig. 7 also includes means for shifting the control of the device 184 from controller 183 to controller 183' when the motor J and the circuits 129 and 130 are respectively replaced by the motor J' and the circuits 129' and 130'. This last mentioned means comprises a pair of normally open relay contacts R13 and a pair of normally closed relay contacts R14, both of which are controlled by the operating coil R1 of the relay R, not shown in Fig. 7, as are the other contacts R2—R12 inclusive.

The controller 183 comprises a mercury switch 185, the contacts of which are respectively connected to terminals 186 and 187. The controller 183' comprises a similar mercury switch 185', the contacts of which are respectively connected to terminals 186' and 187'. For conditions 1 and 2 of the system, the control circuit can be traced from the supply conductor L' to one terminal of the controlled device 184, from the other terminal of the device 184 through contacts R14 to the terminal 186, through the switch 185 (when closed) to the terminal 187, and through a conductor 188 to the other supply conductor L². When the apparatus is in conditions 3 and 4, the control circuit can be traced from the supply conductor L' through the device 184 and contacts R13 to the terminal 186', through the switch 185' (when closed) to the terminal 187', and through the conductor 188 to the other supply conductor L².

Although a simple on-off control system has been shown in Fig. 7 by way of illustration, it is to be understood that the standby systems herein disclosed can be readily adapted to operate with any other more complicated control application.

Figure 8:
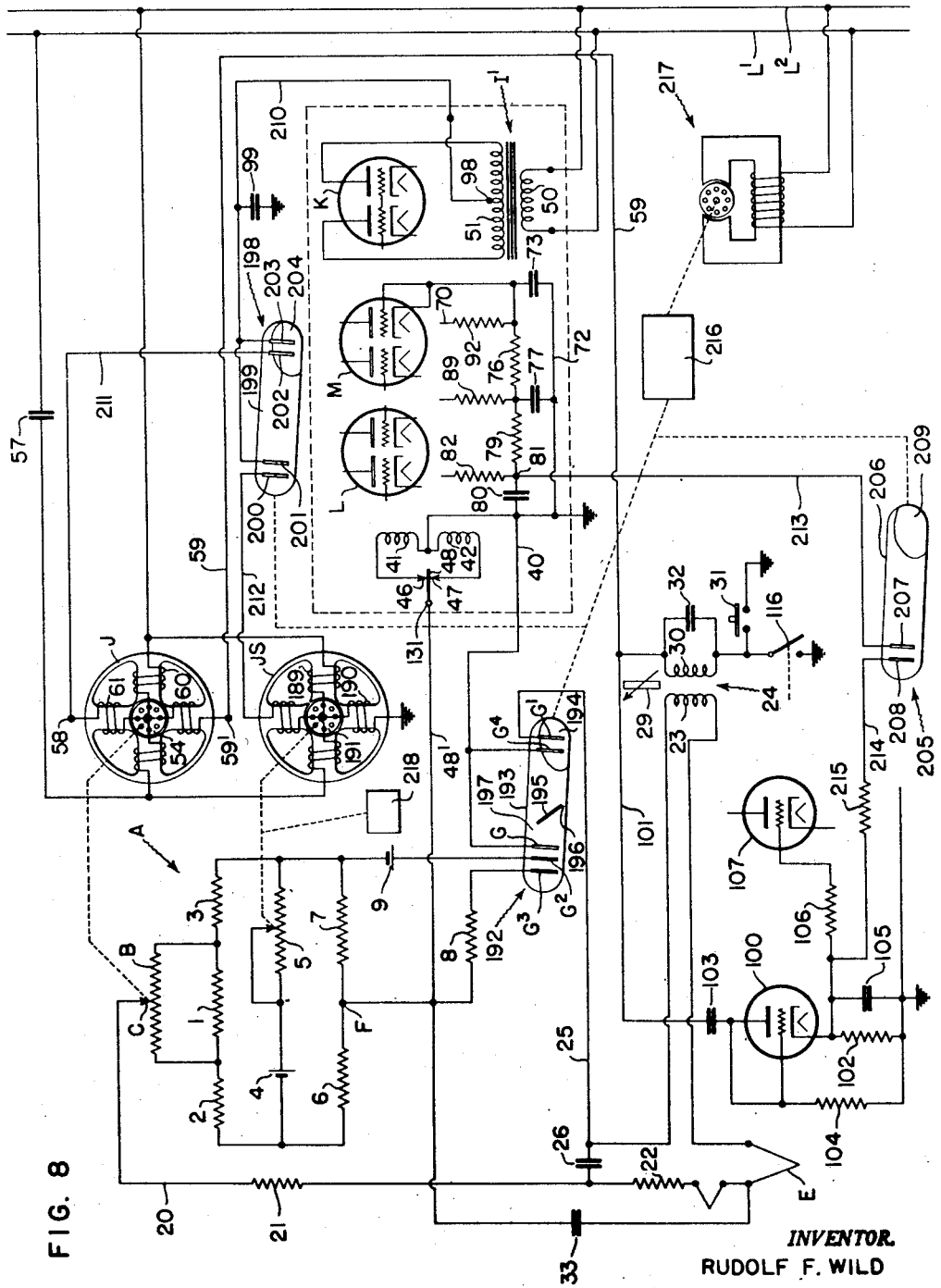
Fig. 8 is a diagram illustrating the adaptation of the present invention to a system employing a different standardizing circuit from that of the system of Fig. 1.

Fig. 8 illustrates, more or less diagrammatically, a modification of the arrangement of Fig. 1 which differs from the latter in respect to its automatic provisions for accomplishing the standardizing or recalibrating adjustments effected manually in Fig. 1. In the system of Fig. 8, standardizing is performed by a reversible electric motor JS, which may well be, and is shown as being, identical to the rebalancing and recording motor J. The motor JS is operatively connected by a suitable linkage to the slider contact of the adjustable battery resistance 5 of the bridge circuit A. Rotation of the motor JS in one direction or the other produces an increase or a decrease, respectively, in the voltage applied to the bridge circuit A by the battery 4. The motor JS comprises a power winding 189, a control winding 190, and a rotor 191, the latter being mechanically coupled to the variable resistance 5 as previously explained.

In Fig. 8, the standardizing switch contact members G, G', G², and G³ are contained in a mercury switch 192. The latter comprises a suitable envelope 193 in one end of which are located the contact members G, G², and G³. The contact member G', and a contact member G⁴ are located in the opposite end of the switch 192, and a suitable quantity of mercury 194 is contained in the envelope 193. A partial, inclined barrier 195 is located within the envelope 193, adjacent to the end of the latter in which are located the contact members G, G², and G³. The barrier 195 is provided with an orifice 196, and an upper opening 197. The mercury switch 192 is so constructed, for a purpose to be hereinafter described, that tilting of the envelope 193 from a position in which the mercury 194 forms a contact between the contact members G' and G⁴ to a position in which the left-hand end of the envelope 193 is lower than the right-hand end in Fig. 8 will cause the mercury to flow from right to left over the top of the barrier 195, thus instantly breaking the contact between the contact members G' and G⁴, and making contact between the contact members G, G², and G³. When the envelope 193 is subsequently tilted in the opposite direction making the right-hand end lower than the left-hand end, the flow of mercury from left to right will be delayed by the barrier 195, which will act to trap the mercury in the left-hand end of the envelope. However, the mercury will flow through the orifice 196, and eventually the contact between the contact members G, G², and G³ will be broken, and contact will be made between the contact members G' and G⁴. The time delay which occurs between the last mentioned tilting of the envelope 193 and the subsequent breaking and making of contacts, just described, is dependent upon the size of the orifice 196 and upon other mechanical construction features of the mercury switch 192.

A second mercury switch 198 is included in the apparatus of Fig. 8 for the purpose of disconnecting the rebalancing motor J from the system during standardizing and for connecting the standardizing motor JS in place of the motor J during that time. To this end, the mercury switch 198 comprises an envelope 199 in one end of which are located a pair of contact members 200 and 201, respectively. A second pair of contact members 202 and 203, respectively, are located in the opposite end of the envelope 199, and the latter also includes a suitable quantity of mercury 204. Tilting the envelope 199 so that the left-hand end is lower than the right-hand end causes the contact between the contact members 202 and 203 to be broken and contact between the contact members 200 and 201 to be made. Conversely, tilting the envelope 199 in the opposite direction causes the contact between the contact members 200 and 201 to be broken and contact to be made between the contact members 202 and 203.

A third mercury switch 205 is included in the apparatus of Fig. 8 to prevent the alarm system from operating to indicate system failure during the standardizing periods, in which periods the high frequency signal is interrupted due to the disconnecting of the motor J from the system. The mercury switch 205 comprises an envelope 206 in one end of which are located a pair of contact members 207, and 208. The envelope 206 also contains a quantity of mercury 209.

In Fig. 8, the amplifier and motor drive circuit of Fig. 1 is only partially shown, in order to avoid unnecessary complication of the figure. As shown, the center tap 98 of the secondary winding 51 of the power transformer I' is connected by a conductor 210 to the contact members 201 and 203 of the mercury switch 198. The contact member 202 of the latter is connected by a conductor 211 to the terminal 58 of the control winding 61 of the motor J. The contact member 200 of the mercury switch 198 is connected by a conductor 212 to one end of the control winding 190 of the motor JS. The other end of the winding 190 is connected to ground. The motor condenser 99 is connected between the conductor 210 and ground, in parallel with whichever one of the control windings 61 and 190 that is connected to the conductor 210.

The power winding 189 of the motor JS is connected in parallel with the power winding 60 of the motor J. To maintain a series resonant circuit, the motor condenser 57 of Fig. 8 must have twice the capacity of the condenser 57 of Fig. 1.

The contact member 207 of the mercury switch 205 is connected by a conductor 213 to the positive filter circuit output terminal 81 of the electronic amplifier. The contact member 208 of the switch 205 is connected by a conductor 214 and through a resistance 215 and the previously mentioned resistance 106 to the control grid of the triode valve 107 of the detector circuit. All components and connections of the circuit of Fig. 8, not specifically mentioned above, are identical with the corresponding components and connections of Fig. 1, although some of these components and connections are not shown in Fig. 8 in order not to unnecessarily complicate the drawing.

At periodically recurring intervals, the mercury switches 192, 198, and 205 are tilted from their normal positions, in which their right-hand ends are lower than their respective left-hand ends, to their standardizing positions, in which their left-hand ends are lower than their respective right-hand ends. At the completion of each standardizing period, these switches are then returned to their normal positions. The switches 192, 198, and 205 are given these tilting movements into and out of their standardizing positions by suitable means indicated at 216 in Fig. 8. The means 216 for periodically tilting the switches 192, 198, and 205 is shown as being driven by a motor 217, which may be the motor employed to drive a moving record sheet or chart when the apparatus of Fig. 8 is of the recording type. The motor 217 may well be of the shaded-pole, synchronous type, and is shown as such in Fig. 8, wherein it is seen to be supplied with energizing voltage from the supply conductors L' and L². As shown, the resistance 5 may be supplied with an indicating device 218 which will indicate the condition of the battery 4.

In the normal operating condition, the system of Fig. 8 functions in a manner identical to that described for the system of Fig. 1. When standardizing occurs, however, the operation of the apparatus of Fig. 8 is as follows: The mercury switch 205 is tilted downward to the left into its standardizing position by the action of the device 216, driven by the motor 217. This completes the circuit between the positive terminal 81 of the amplifier and the control grid of the valve 107 of the detector, which circuit can be traced from the terminal 81, through the conductor 213 to the contact member 207, through the mercury in the switch 205 to the contact member 208, and through the conductor 214 and the resistances 215 and 106 to the control grid of the valve 107. This circuit causes a positive voltage to be placed on the control grid of the valve 107, but since the latter is normally conductive when the system is operating satisfactorily, this application of a positive control grid voltage produces no effect on the detector circuit. Following the tilting of the switch 205, the switch 198 is tilted downward to the left into its standardizing position. This causes the circuit to the control winding 61 of the rebalancing motor J to be opened, and the circuit to the control winding 190 of the standardizing motor JS to be completed. This latter circuit can be traced from the center-tap 98 of the secondary winding 51 of the power transformer I' through the conductor 210 to the contact member 201, through the mercury in the switch 198 to the contact member 200, and through the conductor 212 and control winding 190 of the motor JS to ground. The opening of the control winding circuit of the motor J causes the high frequency oscillating signal to disappear, but the positive voltage applied to the control grid of the valve 107 by the previously described circuit prevents the apparatus from indicating system failure and prevents the shut-down of the system which would normally occur upon the disappearance of the high frequency signal.

Following the tilting of the switch 198, the switch 192 is tilted downward to the left into its standardizing position, thus removing the thermocouple E from the system and connecting in the standard cell 9, as explained hereinbefore in connection with the apparatus of Fig. 1. If standardization is necessary, a signal will be transmitted to the motor JS, which will, in turn, drive the slider on the resistance 5 to such a position as to effect standardization of the system.

At the end of the standardizing period, the length of which is determined by the design of the device 216 and the speed of the motor 217, the switch 192 will be tilted downward to the right into its normal position, but the mercury will temporarily remain in contact with the contact members G, G², and G³, due to the barrier 195. After the tilting of the switch 192, the switch 198 will be tilted downward to the right into its normal position, thus breaking the control winding circuit of the motor JS and completing the control winding circuit of the motor J. This latter circuit can be traced from the center-tap 98 of the transformer winding 51 through the conductor 210 to the contact member 203, through the mercury in the switch 198 to the contact member 202, and through the conductor 211, the control winding 61, the conductor 59, the transformer winding 30, and the switch 116 to ground.

Following the tilting of the switch 198, sufficient mercury in the switch 192 will have passed through the orifice 196 to break the contact between the contact members G, G², and G³ and to make contact between the members G' and G⁴, thereby removing the standard cell from the system and replacing the thermocouple. Finally, the switch 205 is tilted downward to the right into its normal position, thereby removing the positive potential from the control grid of the valve 107. Since the return of the switch 198 to its normal position has already completed the control winding circuit of the motor J and thereby reestablished the high frequency signal, however, the removal of the positive control grid signal produces no effect on the system.

In Fig. 9 there is illustrated, more or less diagrammatically, one form which the device 216 of Fig. 8 may take. In Fig. 9, the mercury switches 192, 198, and 205 are shown mounted on a supporting member 219, which is rotatable through a small angle about a point 220. The member 219 is biased in a clockwise direction by a spring 221, and is given periodic counterclockwise standardizing movements by a lever 222 driven by a follower 223, which is in engagement with the periphery 224 of a cam 225. The cam 225 is driven through suitable means, such as gears 226 and 227, by the motor 217 of Fig. 8, not shown in Fig. 9.

When the follower 223 is in engagement with the portion 224 of the cam 225, the switches 192, 198, and 205 are maintained in their normal positions by the action of the spring 221. The cam 225 has, however, a raised peripherial portion 228 which, when engaged by the follower 223 once each revolution, causes counter-clockwise rotation of the member 219, thereby tilting the switches 192, 198, and 205 into their standardizing positions. The latter are so mounted on the member 219 that the switch 205 will be tilted into its standardizing position first, followed first by the switch 198, and then by the switch 192, as explained hereinbefore. This allows the alarm prevention voltage to be applied to the valve 107 by the switch 205 prior to the opening of the control winding circuit of the motor J by the switch 198, and allows the motor J to be removed from the system by the switch 198 before the standardizing circuit is completed by the switch 192.

The size and shape of the portion 228 of the cam 225 are so chosen as to give the required motion to the member 219, and also to maintain the member 219 in its standardizing position for a sufficient length of time to permit complete standardizing to take place under all conditions. At the end of the standardizing period, the follower 223 returns to the cam portion 224, and the switches 192, 198, and 205 are returned to their normal positions by the clockwise rotation of the member 219 under the action of the spring 221. The switch 192 is tilted first, but due to the time delay action of the barrier 195, the contact between the left-hand end contact members is momentarily maintained. The switch 198 is tilted next, and thereby removes the motor JS from the systems and replaces the motor J. By this time, the mercury in the switch 192 has passed through the barrier orifice 196, and the system is thereby returned from the standardizing position into the normal position. Finally, the switch 205 is returned to its normal position, thereby removing the alarm-prevention voltage from the control grid of the valve 107 subsequent to the return of the system to the normal condition by the switch 192, which return follows the replacement of the standardizing motor JS by the rebalancing motor J in the amplifier and motor drive circuit output.

The device 216 for operating the standardizing switches of the circuit of Fig. 8 may take other forms than that illustrated in Fig. 9. For example, two other forms of the device 216 are illustrated in Figs. 10 and 11 respectively. The devices illustrated in Figs. 10 and 11 both include suitable means for preventing the standardizing motor JS from being driven as a result of a change in the quantity being measured, and for preventing the rebalancing motor J from being driven as a result of a need for system standardization, during the time in which switching is taking place. The last mentioned devices also include means for preventing actuation of the alarm device during standardizing.

In Fig. 10, the illustrated device is identical to that of Fig. 9, except in regard to the mercury switches 192 and 198 of Fig. 9. The latter switches are replaced in Fig. 10 by mercury switches 192' and 198', respectively, having functions identical to those of the corresponding switches 192 and 198 of Fig. 9. The switch 198' differs from the switch 198 in that the former is provided with a slightly curved envelope while the latter has the conventional straight envelope. The switch 192' differs from the switch 192 in that the former does not contain a barrier as does the switch 192.

In operation, rotation of the member 219 of Fig. 10 in a counter-clockwise direction first causes the application of the alarm-prevention voltage to the valve 107 through the switch 205. Next, the rebalancing motor J is disconnected from the circuit by the switch 198', but the latter does not immediately connect the standardizing motor JS into the circuit since the mercury located in the switch 198' momentarily rests in the mid-portion of the curved envelope of the switch and hence does not contact any of the switch contact members. Further rotation of the member 219 next causes the mercury switch 192' to instantly switch the measuring circuit from its normal condition to its standardizing condition, and finally, the switch 198' becomes tilted a sufficient amount to cause it to connect the motor JS into the circuit.

At the completion of the standardizing period, the member 219 is rotated in a clockwise direction, and the operating sequence of the mercury switches 192', 198', and 205 is opposite to that just described. More specifically, the motor JS is first removed from the circuit by the action of the switch 198'. Next, the switch 192' switches the measuring circuit from its standardizing condition to its normal running condition, the switch 198' connects the motor J into the circuit, and finally the alarm-prevention voltage is removed from the detector circuit by the opening of the switch 205.

In the operation of the device of Fig. 10, neither of the motors J or JS is connected in the circuit while the measuring circuit is being switched from its normal condition to its standardizing condition, or vice-versa. Consequently, any tendency for the rebalancing motor J to be driven in response to a standardizing signal is eliminated, as is any tendency for the standardizing motor JS to be driven in response to a change in the quantity being measured. Further, at all times in the standardizing cycle when the motor J is not connected in the circuit, the alarm-prevention voltage is applied to the detector circuit to prevent operation of the alarm device as a result of an open motor circuit.

The device illustrated in Fig. 11 for operating the standardizing switches differs from those devices previously disclosed in that the former comprises a conventional microswitch 205' in place of the mercury switch 205 of Figs. 8, 9, and 10. Also, the switches of Fig. 11 are actuated by a mechanism including a Geneva movement 229 which mechanism replaces the cam and follower mechanism of Figs. 9 and 10. In Fig. 11, the mercury switches 192' and 198 are mounted on a member 230 which is pivoted to turn about a fixed point 231. The member 230 is biased in a counter-clockwise direction by a spring 232, which spring normally holds the member 230 against a stop 233. Fastened to the member 230 is a lever 234, through which the member 230 is given periodic clockwise rotations when the lever is engaged by a cam 235. The latter is fastened to, and driven by, a wheel 236 which rotates about a fixed point 237 and forms a part of the Geneva movement 229. The wheel 236 is given periodic movements in a counterclockwise direction by a member 238 carrying a driving pin 239, the wheel 236 and member 238 forming the Geneva movement 229. The member 238 is continuously rotated through a suitable gear 240 by the driving gear 227, the latter being driven by the motor 217 of Fig. 8, not shown in Fig. 11. The manner in which the Geneva movement operates to impart to the cam 235 an intermittent motion of rotation in a counter-clockwise direction is well known to those skilled in the art, and need not be described in detail here.

The cam 235 has a raised peripheral rear portion 241 which is adapted to engage the actuating plunger 242 of the switch 205' and thereby to operate the latter at suitable times. The switch 205' is of the normally open type, and functions, when closed, to apply the alarm-prevention voltage to the detector circuit, as does the switch 205 of Figs. 8, 9, and 10.

In the operation of the device of Fig. 11, one of the intermittent periods of rotation of the wheel 236 serves to effect standardization. At the start of this period, the cam portion 241 of the cam 235 engages the actuating plunger 242 of the switch 205' and thereby causes the latter to apply the alarm-prevention voltage to the detector circuit. As the cam 235 continues to rotate, it engages the lever 234 and thereby tilts the member 230 in a clockwise direction. As a result, the rebalancing motor J is disconnected from the circuit and the standardizing motor JS is connected into the circuit by the switch 198, just prior to the switching of the measuring circuit from the normal condition to the standardizing condition by the action of the switch 192'.

As the cam 235 continues to rotate, the standardizing period continues, until the cam 235 has rotated to a point where the lever 234 slips from engagement with the cam 235 and allows the spring 232 to give the member 230 a quick-return counter-clockwise rotation. This quick-return movement of the member 230 rapidly tilts the switches 192' and 198 back into their original, normal positions, with the result that these switches operate simultaneously to replace in the circuit the motor JS with the motor J, and to switch the measuring circuit from the standardizing to the normal condition. The final motion of the cam 235 causes the switch 205' to open, which removes the alarm-prevention voltage from the detector circuit. A complete rotation of the wheel 236, comprising a series of periodic rotations, is then necessary before standardizing will take place again. Since the switches 192' and 198 are quickly returned to their normal positions, their action practically simultaneous, and there is no tendency for either of the motors J or JS to be driven as a result of an incorrectly interpreted signal.

Subject matter disclosed but not claimed herein is disclosed and is being claimed in the concurrently filed applications of Jack A. Caldwell, Serial No. 678,394, filed June 21, 1946, and Herbert A. Clarke, Serial No. 678,254, filed June 21, 1946. Other subject matter disclosed but not claimed herein is disclosed in my concurrently filed applications Serial No. 678,256, filed June 21, 1946, and Serial No. 678,258, filed June 21, 1946, and in my application Serial No. 735,009, filed March 15, 1947, Patent No. 2,452,023, issued October 19, 1948, as a continuation in part of the instant application.

While in accordance with the provisions of the statutes, I have illustrated and described the best forms of embodiment of my invention now known to me, it will be apparent to those skilled in the art that changes may be made in the forms of the apparatus disclosed without departing from the spirit of my invention as set forth in the appended claims, and that in some cases certain features of my invention may be used to advantage without a corresponding use of other features.

Having now described my invention, what I claim as new and desire to secure by Letters Patent, is:

1. Self-balancing potentiometric measuring and control apparatus comprising a bridge circuit including a slide wire resistance, a slider contact adjustable along said resistance, a thermocouple, a standby thermocouple, means operative in a normal position to connect said thermocouple between said contact and a point in said circuit at a potential differing from the potential of said contact by an amount which is equal and opposite to the voltage produced by said thermocouple when said contact is in a position to balance said bridge circuit and operative in another position to connect said standby thermocouple between said contact and said point, a reversible motor for adjusting said contact to rebalance said circuit when unbalanced by a variation in the voltage of the thermocouple connected between said contact and said point, an amplifier including an input circuit and an output circuit and electronic valve amplifying means connected between said input and output circuits, said motor having a control winding connected to said output circuit, amplifier energizing means for supplying alternating current of relatively low frequency to said amplifier, means connected in circuit with said contact and said point to impress on said input circuit an alternating current signal which is of relatively low frequency and is of a magnitude in predetermined proportion to the difference between said voltage and potential difference and is dependent in phase on whether said voltage exceeds or is smaller than said potential difference, means coupling said input and output circuits to transfer energy from said output circuit to said input circuit and thereby superimpose a relatively high frequency signal on the relatively low frequency signal impressed on said input circuit, the magnitude of the relatively low frequency signal being proportioned to carry the relatively high frequency signal through said amplifier when said apparatus is in its normal operative condition, and high frequency signal detecting means for adjusting said first mentioned means from said normal position to said another position to replace said thermocouple with said standby thermocouple when the relatively high frequency signal disappears from said output circuit.

2. Self-balancing potentiometric measuring and control apparatus comprising a bridge circuit including a slide wire resistance, a slider contact adjustable along said resistance, a source of variable unidirectional voltage, a standby source of variable unidirectional voltage, means operative in a normal position to connect said first mentioned source between said contact and a point in said circuit at a potential differing from the potential of said contact by an amount which is equal and opposite to the voltage of said first mentioned source when said contact is in a position to balance said bridge circuit and operative in another position to connect said standby source of voltage between said contact and said point, a reversible motor for adjusting said contact to rebalance said circuit when unbalanced by a variation in the voltage of the source connected between said contact and said point, an amplifier including an input circuit and an output circuit and electronic valve amplifying means connected between said input and output circuits, said motor having a control winding connected to said output circuit, amplifier energizing means for supplying alternating current of relatively low frequency to said amplifier, means connected in circuit with said contact and said point to impress on said input circuit an alternating current signal which is of relatively low frequency and is of a magnitude in predetermined proportion to the difference between said voltage and potential difference and is dependent in phase on whether said voltage exceeds or is smaller than said potential difference, means coupling said input and output circuits to transfer energy from said output circuit to said input circuit and thereby superimpose a relatively high frequency signal on the relatively low frequency signal impressed on said input circuit, the magnitude of the relatively low frequency signal being proportioned to carry the relatively high frequency signal through said amplifier when said apparatus is in its normal operative condition, and high frequency signal detecting means for adjusting said first mentioned means from said normal position to said another position to replace said first mentioned source with said standby source when the relatively high frequency signal disappears from said output circuit.

3. Self-balancing potentiometric measuring and control apparatus comprising a bridge circuit including a slide wire resistance, a slider contact adjustable along said resistance, a source of variable unidirectional voltage, a standby source of variable unidirectional voltage, means operative in a normal position to connect said first mentioned source between said contact and a point in said circuit at a potential differing from the potential of said contact by an amount which is equal and opposite to the voltage of said first mentioned source when said contact is in a position to balance said bridge circuit and operative in another position to connect said standby source of voltage between said contact and said point, a reversible motor for adjusting said contact to rebalance said circuit when unbalanced by a variation in the voltage of the source connected between said contact and said point, said motor having a control winding, an amplifier including an input circuit and an output circuit and electronic valve amplifying means connected between said input and output circuits, a standby amplifier including an input circuit and an output circuit and electronic valve amplifying means connected between the last mentioned input and output circuits, amplifier energizing means adapted to supply alternating current of relatively low frequency to each of said amplifiers, means connected in circuit with said contact and said point and adapted to derive and to impress on the input circuits of each of said amplifiers an alternating current signal which is of relatively low frequency and is of a magnitude in predetermined proportion to the difference between said voltage and potential difference and is dependent in phase on whether said voltage exceeds or is smaller than said potential difference, means adapted to couple the input and output circuits, respectively, of each of said amplifiers to transfer energy from each output circuit to the respective input circuit to thereby impress a relatively high frequency signal on the relatively low frequency signal impressed on the input circuit, the magnitude of the relatively low frequency signal being proportioned to carry the relatively high frequency signal through the amplifier when said apparatus is in its normal operative condition, means operative in a normal position to impress the derived alternating current signal on the input circuit of said first mentioned amplifier only and to connect the control winding of said motor in the output circuit thereof and operative in another position to impress the derived alternating current signal on the input circuit of said standby amplifier only and to connect the control winding of said motor in the output circuit of said standby amplifier, and high frequency signal detecting means for adjusting said first mentioned means and said last mentioned means from their normal operative positions to their other positions to replace said first mentioned source with said standby source and to replace said amplifier with said standby amplifier when the relatively high frequency signal disappears from said output circuit.

4. Self-balancing potentiometric measuring and control apparatus comprising a bridge circuit including a slide wire resistance, a slider contact adjustable along said resistance, a source of variable unidirectional voltage, a standby source of variable unidirectional voltage, means operative in a normal position to connect said first mentioned source between said contact and a point in said circuit at a potential differing from the potential of said contact by an amount which is equal and opposite to the voltage of said first mentioned source when said contact is in a position to balance said bridge circuit and operative in another position to connect said standby source of voltage between said contact and said point, a reversible motor for adjusting said contact to rebalance said circuit when unbalanced by a variation in the voltage of the source connected between said contact and said point, said motor having a control winding, an amplifier including an input circuit and an output circuit and electronic valve amplifying means connected between said input and output circuits, a standby amplifier having an input circuit and an output circuit and electronic valve amplifying means connected between the last mentioned input and output circuits, amplifier energizing means adapted to supply alternating current of relatively low frequency to each of said amplifiers, means connected in circuit with said contact and said point and adapted to derive and impress on the input circuits of each of said amplifiers an alternating current signal which is of relatively low frequency and is of a magnitude in predetermined proportion to the difference between said voltage and potential difference and is dependent in phase on whether said voltage exceeds or is smaller than said potential difference, means adapted to couple the input and output circuits, respectively, of each of said amplifiers to transfer energy from each output circuit to the respective input circuit to thereby impress a relatively high frequency signal on the relatively low frequency signal impressed on said input circuit, the magnitude of the relatively low frequency signal being proportioned to carry the relatively high frequency signal through the amplifier when said apparatus is in its normal operative condition, second means operative in a normal position to impress the derived alternating current signal on the input circuit of said first mentioned amplifier only and to connect the control winding of said motor in the output circuit thereof and operative in another position to impress the derived alternating current signal on the input circuit of said standby amplifier only and to connect the control winding of said motor in the output circuit of said standby amplifier, means for selectively adjusting said first mentioned means and said second means from their normal operative positions to their other positions to replace said first mentioned source with said standby source and to replace said amplifier with said standby amplifier when the relatively high frequency signal disappears from said output circuit, and high frequency detecting means adapted to be connected to the output circuit of each of said amplifiers to control the operation of said adjusting means.

5. Measuring and control apparatus comprising an electronic amplifying device having an input circuit and an output circuit, a standby electronic amplifying device having an input circuit and an output circuit, a measuring device and a standby measuring device each adapted to be connected to the input circuit of each of said electronic amplifying devices and each responsive to the variations in the value of a variable quantity and adapted on a change in said quantity to produce a relatively low frequency electric signal indicative of said change, adjustable means operative in a first condition to connect said measuring device to the input circuit of said electronic amplifying device, operative in a second condition to connect said standby measuring device to the input circuit of said electronic amplifying device, operative in a third condition to connect said measuring device to the input circuit of said standby electronic amplifying device, and operative in a fourth condition to connect said standby measuring device to the input circuit of said standby electronic amplifying device, control means adapted to be connected to the output circuit of said electronic amplifying device and to the output circuit of said standby electronic amplifying device, means coupling the input and output circuits, respectively, of each of said electronic amplifying devices to transfer energy from each output circuit to the respective input circuit and thereby superimpose a relatively high frequency signal on the relatively low frequency signal impressed on said input circuit, the magnitude of the relatively low frequency signal being proportioned to carry the relatively high frequency signal through the amplifier when said apparatus is in its normal operative condition, and high frequency signal detecting means for controlling the adjustment of said adjusting means.

6. Measuring and control apparatus comprising an electronic amplifying device having an input circuit and an output circuit, a standby electronic amplifying device having an input circuit and an output circuit, a measuring device and a standby measuring device each adapted to be connected to the input circuit of each of said electronic amplifying devices and responsive to the variations in the value of a variable quantity and adapted on a change in said quantity to produce a relatively low frequency electric signal indicative of said change, adjustable means operative in a first condition to connect said measuring device to the input circuit of said electronic amplifying device, operative in a second condition to connect said standby measuring device to the input circuit of said electronic amplifying device, operative in a third condition to connect said measuring device to the input circuit of said standby electronic amplifying device, and operative in a fourth condition to connect said standby measuring device to the input circuit of said standby electronic amplifying device, control means for said measuring device connected to the output circuit of said electronic amplifying device, control means for said standby measuring device connected to the output circuit of said standby electronic amplifying device, means coupling the input and output circuits, respectively, of each of said electronic amplifying devices to transfer energy from each output circuit to the respective input circuit and thereby superimpose a relatively high frequency signal on the relatively low frequency signal impressed on said input circuit, the magnitude of the relatively low frequency signal being proportioned to carry the relatively high frequency signal through the amplifier when said apparatus is in its normal operative condition, and high frequency signal detecting means for controlling the adjustment of said adjusting means.

7. Measuring and control apparatus comprising an electronic amplifying device having an input circuit and an output circuit, a standby electronic amplifying device having an input circuit and an output circuit, a measuring device and a standby measuring device each adapted to be connected to the input circuit of each of said electronic amplifying devices and responsive to the variations in the value of a variable quantity and adapted on a change in said quantity to produce a relatively low frequency electric signal indicative of said change, adjustable means operative in a first condition to connect said measuring device to the input circuit of said electronic amplifying device, operative in a second condition to connect said standby measuring device to the input circuit of said electronic amplifying device, operative in a third condition to connect said measuring device to the input circuit of said standby electronic amplifying device, and operative in a fourth condition to connect said standby measuring device to the input circuit of said standby electronic amplifying device, regulating means for regulating the value of said variable quantity, control means connected to the output circuit of said electronic amplifying device to control said measuring device and adapted to control said regulating means, control means connected to the output circuit of said standby electronic amplifying device to control said standby measuring device and adapted to control said regulating means, means coupling the input and output circuits, respectively, of each of said electronic amplifying devices to transfer energy from each output circuit to the respective input circuit and thereby superimpose a relatively high frequency signal on the relatively low frequency signal impressed on said input circuit, the magnitude of the relatively low frequency signal being proportioned to carry the relatively high frequency signal through the amplifier when said apparatus is in its normal operative condition, and high frequency signal detecting means for controlling the adjustment of said adjusting means.

8. Measuring and control apparatus of the type comprising an electronic amplifying device having an input circuit and an output circuit, a measuring device connected to said input circuit and responsive to variations in the value of a variable quantity and adapted on a change in said quantity to impress a relatively low frequency electric signal indicative of said change on said input circuit, and a control device connected to said output circuit and actuated by and in accordance with said low frequency signal, and in combination with said apparatus, means coupling said input and output circuits to transfer energy from said output circuit to said input circuit and thereby impress a relatively high frequency signal on the relatively low frequency signal impressed on said input circuit, standby means adapted to replace at least one of said devices, switching means operative upon the development of a defect in one of said devices to disconnect said one device from said apparatus and to replace said defective device with said standby means, and means responsive to the disappearance of said high frequency signal in the output circuit of said amplifying device to actuate said switching means.

9. In combination with electrical measuring and control apparatus comprising an electronic amplifier having an input circuit and an output circuit, measuring means connected to said input circuit and responsive to variations in the value of a variable quantity and adapted on a change in said quantity to impress an undulating electric signal indicative of said change and of relatively low frequency on said input circuit, said measuring means including at least two measuring elements only one of which is adapted to be connected to said input circuit at any given time, and a mechanism connected to said output circuit and actuated by and in selective accordance with the relatively low frequency signal impressed on said input circuit, of means coupling said input and output circuits to transfer energy from said output circuit to said input circuit and thereby impress a relatively high frequency signal on the relatively low frequency signal impressed on said input circuit, the magnitude of the relatively low frequency signal being proportioned to carry the relatively high frequency signal through said amplifier when said apparatus is in its normal operating condition, and control means for producing a control effect when the relatively high frequency signal disappears from said output circuit, said control means including means for disconnecting said one measuring element from said input circuit upon operative failure of said one measuring element and for replacing the latter by another of said measuring elements.

10. In combination with electrical measuring and control apparatus comprising at least two electronic amplifiers, each having an input circuit and an output circuit, measuring means connected to the input circuit of one of said electronic amplifiers and responsive to variations in the value of a variable quantity and adapted on a change in said quantity to impress an undulating electric signal indicative of said change and of relatively low frequency on the input circuit of said one amplifier, and a mechanism connected to the output of said one amplifier and actuated by and in selective accordance with the relatively low frequency signal impressed on the input circuit of said one amplifier, of means coupling the input and output circuits of said one amplifier to transfer energy from the output circuit to the input circuit and thereby impress a relatively high frequency signal on the relatively low frequency signal impressed on the input circuit of said one amplifier, the magnitude of the relatively low frequency signal being proportioned to carry the relatively high frequency signal through said one amplifier when said apparatus is in its normal operative condition, and control means for producing a control effect when the relatively high frequency signal disappears from said output circuit, said control means including means for disconnecting said measuring means and said mechanism from the input and output circuits, respectively, of said one amplifier and for connecting said measuring means and said mechanism to the input and output circuits, respectively, of another of said electronic amplifiers.

11. Measuring and control apparatus of the type comprising an electronic amplifying device having an input circuit and an output circuit, a measuring device connected to said input circuit and responsive to variations in the value of a variable quantity and adapted on a change in said quantity to impress an electric signal indicative of said change on said input circuit, means normally operative to produce a control signal of different character from said electric signal and to superimpose said control signal on said electric signal, and a control device connected to said output circuit and actuated by and in selective accordance with said electric signal, and in combination with said apparatus, standby means adapted to replace at least one of said devices, switching means operative upon the development of a defect in one of said devices to disconnect said defective device from said apparatus and to replace the said defective device with said standby means, and means responsive to a change in said control signal indicative of an apparatus defect to actuate said switching means.

12. Measuring and control apparatus of the type comprising an electronic amplifying device having an input circuit and an output circuit, a measuring device connected to said input circuit and responsive to variations in the value of a variable quantity and adapted on a change in said quantity to impress an electric signal indicative of said change on said input circuit, means normally operative to produce a control signal of different character from said electric signal and to superimpose said control signal on said electric signal, and a control device connected to said output circuit and actuated by and in selective accordance with said electric signal, and in combination with said apparatus, a plurality of standby devices adapted to replace, respectively, a plurality of said first mentioned devices, switching means operative upon the development of a defect in any of said first mentioned devices to disconnect said defective device from said apparatus and to replace the defective device with one of said standby devices, and means responsive to a change in said control circuit indicative of an apparatus defect to actuate said switching means.

13. A combination as specified in claim 4 including alarm means and wherein said adjusting means includes means operating upon disappearance of said high frequency signal, due to an apparatus defect, to adjust said first mentioned means to its other position to effect replacement of said first mentioned voltage source with said standby voltage source, operating thereafter upon failure of the high frequency signal to reappear or upon subsequent disappearance of said high frequency signal after reappearance, due to another apparatus defect, to adjust said second means to effect replacement of said standby voltage source with said first mentioned voltage source and to effect replacement of said first mentioned amplifier with said standby amplifier, operating thereafter upon failure of the high frequency signal to reappear or upon subsequent disappearance of said high frequency signal, after reappearance, due to another apparatus defect, to adjust said first mentioned means to again effect replacement of said first mentioned voltage source with said standby voltage source, and operating thereafter upon failure of the high frequency signal to reappear or upon subsequent disappearance of said high frequency signal, after reappearance, due to another apparatus defect, to actuate said alarm means.

RUDOLF F. WILD.

REFERENCES CITED

The following references are of record in the file of this patent:

UNITED STATES PATENTS

| Number | Name | Date |
|---|---|---|
| 2,077,179 | Moseley | Apr. 13, 1937 |